United States Patent [19]

Benghiat

[11] Patent Number: 4,757,456

[45] Date of Patent: Jul. 12, 1988

[54] DEVICE AND METHOD FOR UTILITY METER READING

[76] Inventor: Ralph Benghiat, 282 Trino Way, Pacific Palisades, Calif. 90272

[21] Appl. No.: 603,624

[22] Filed: Apr. 25, 1984

Related U.S. Application Data

[63] Continuation-in-part of Ser. No. 265,422, May 19, 1981, abandoned.

[51] Int. Cl.[4] .......................... G06K 1/00; G06F 3/14

[52] U.S. Cl. .................................... 364/464; 364/900; 364/483

[58] Field of Search ... 364/200 MS File, 900 MS File, 364/464, 483

[56] References Cited

U.S. PATENT DOCUMENTS

| | | | |
|---|---|---|---|
| 3,932,730 | 1/1976 | Ambrosio | 364/464 |
| 4,016,542 | 4/1977 | Azure | 364/900 |
| 4,031,515 | 6/1977 | Kashio | 364/900 |
| 4,090,247 | 5/1978 | Martin | 364/900 |
| 4,133,034 | 1/1979 | Etter | 364/900 |
| 4,169,290 | 9/1979 | Reed et al. | 364/900 |
| 4,254,472 | 3/1981 | Juergel et al. | 364/900 |
| 4,352,164 | 9/1982 | Reed et al. | 364/900 |
| 4,387,296 | 6/1983 | Newell et al. | 364/464 |

*Primary Examiner*—Eddie P. Chan
*Attorney, Agent, or Firm*—Russell E. Hattis

[57] ABSTRACT

A method and apparatus are described for directing operators to a plurality of locations to gather data in a portable data collection apparatus. The method provides for data compression for efficient utilization of solid state memory in the apparatus and allows for the data describing the multiple accounts to be in variable numbers of fields and field lengths. The apparatus keyboard provides for sequential and random accessing of the accounts for data entry and display, and for listings of the different types of areas to be visited. Additionally, it provides for searching missed accounts and for locating a desired account in the record. Capabilities are provided for storing new accounts and identifying their location in the record. Specifically, the application for utility meter reading is disclosed, in which, data read from a plurality of utility meters is stored in the apparatus by the meter reader, and later transmitted to a data processor for billing purposes.

22 Claims, 29 Drawing Sheets

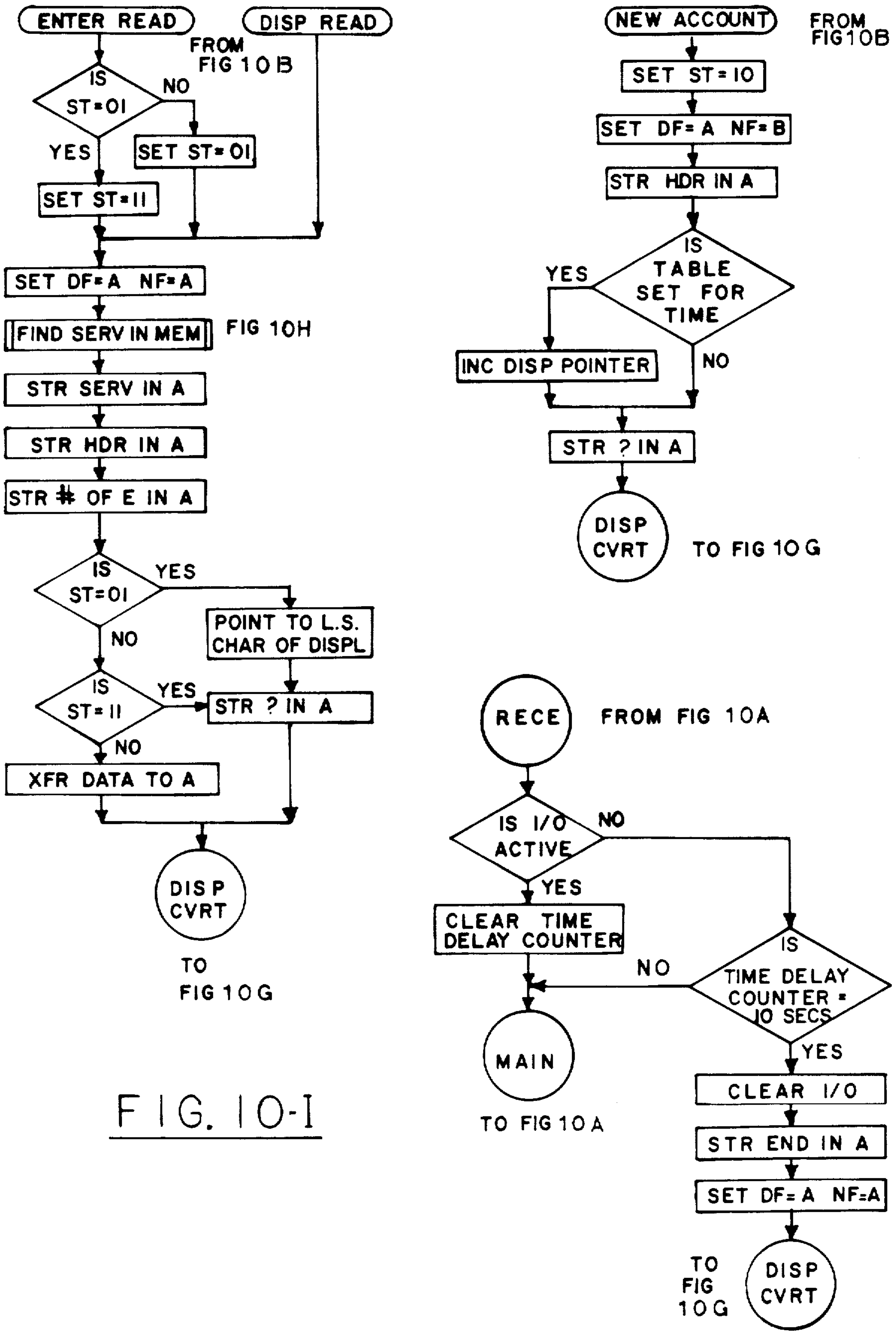
FIG. 10-I

DEVICE AND METHOD FOR UTILITY METER READING

REFERENCE TO RELATED APPLICATION

This application is a continuation-in-part application of pending U.S. application Ser. No. 06/265,422, filed May 19, 1981, now abandoned.

BACKGROUND OF THE INVENTION

1. Field of the Invention

This invention relates to an improved device for data collection and retrieval, having its primary use for hand held data entry devices used for utility meter reading, data entry and readout purposes. Such devices generally include memory to store data, a keyboard to select specific data for display and to store new data, a display, an interface to receive or transmit data to a computer and/or to print a hard copy.

2. State of the Prior Art

In the prior art preprinted forms are used to efficiently record dta gathered or collected in the field. The data is later transfered to a computer for analysis, test evaluation, file compilation, tabulation or invoicing.

The weakness in this system lies in the intermediate processing stage, which relies on manual data transfer, or, by means of reading devices, from the forms to the computer. This stage has in general been plagued with inaccuracies, inefficiencies and is time consuming.

To offset these difficulties and to streamline this operation, disclosures have been made of portable, hand held data collection devices containing a keyboard display, memory and interface to provide means for storing the data via the keyboard as it is collected, and for later transfer electronically into the computer.

Comparing the two data collection systems, the preprinted form has the advantage of a large and unrestrictive memory space, for in a page, one can preprint qualifying information, allocate spaces for field entries, overprint via computer additional specific data and allocate spaces for selective field notation, as it arises in the course of data collection.

A portable, hand held data collection device is restricted by its memory and size and, of course, by the need to have adequate capacity for at least a days work, for best utilization of the operators time.

This, and the type of internal organization designed in the device, in prior art, has restricted their use to some classes of applications.

There are classes of applications, where the form format is simple, for instance, re-ordering of goods. As an example, a column or field is allocated to part number or to item identification and another for quantity to order. Each field length is preset as indicated by the application. An entry, therefore, has fixed format in the number of characters per field and the number of fields and each entry is stored in memory contiguously and adjacent to the previous entry. To retrieve the data, say for display, the memory is addressed in fixed increments equal to the length of both fields.

In other classes of application, data from the computer is required in order to aid, instruct or qualify the data gathering process. An example is a widespread network of unattended field installations where an operator is required to inspect and collect say, three variables. The data from the computer would be a list of locations of the installations to visit. In this case, we have again a fixed format.

Azur describes in U.S. Pat. No. 4,016,542 a data collection device organized as an electronic notebook. Using the last example given above, the data collection device is programmed to accomodate four fields per line of which the first field is the computer data, namely the location of the installation, and the other three are allocated to recording of the three variables. Each line in this collection device pertains to a different installation and all lines have identical, fixed format with corresponding fields in each line matching. In operation, the device responds to a fixed format, except that it can be reprogrammed if another application requires a different fixed field format. Yet, other classes of application exist, which, also require data from the computer, which can have fixed or variable field lengths and variable format. (ie. continuously variable number of fields)

An example is utility meter reading, where an address and other relevant data, which might be selectively incorporated per subscriber, is provided by the computer. This data enables the meter reader to locate and identify each of the plurality of meters per subscriber and to record the meter readings. In this example, unless the route record is simplified into restricted, fixed format, the prior art will not function, as exemplified by the Azur U.S. Pat. No. 4,016,542, Reed et al U.S. Pat. No. 4,169,290 or Martin U.S. Pat. No. 4,090,247. The Reed or Martin Patents are simply a restricted adaptation (non programmable fixed field length) of the Azur Patent. The reason for the restricted adaptability, is that the Azur, Martin or the Reed developments rely on a preprogrammed positional system, in which memory addressing coordinates are generated to specify the locations where the data is stored. This is useful for columnar formatting with identical customer data format. But, if the format changes, as it often does, from customer to customer, and from Route to Route and in addition, the meter reader desires selectively to inject additional useful, but not preprogrammed information, the prior art meter reading devices cannot be adapted or used. Azur U.S. Pat. No. 4,016,542; Reed et al U.S. Pat. Nos. 4,169,290 and 4,352,164; Etter U.S. Pat. No. 4,133,034; Martin U.S. Pat. No. 4,090,247 or Newell U.S. Pat. No. 4,387,296 disclose fixed sequential systems of addressing of data in memory, whereby a key activation can only step into the next file or account in the sequence. In the specific application of meter reading, the meter reader often must decide to deviate from the direction of his movement prescribed by his meter reading device. Flooding for instance, can stop him in his tracks and if he elects to continue elsewhere, readdressing the device to start at a new location can be very onerous, and can lead to accounts being missed.

Locating alternate streets or buildings is not only desirable, but a necessary feature in a meter reading application, more so, when all the data is hidden in a device and not accessible at a glance, as would be, by quickly leafing through the pages of a meter book. None of the prior art disclosures provide for such aids.

As often is the case, meter readers deviate from the prescribed sequence or order of reading meters sometimes for convenience and often times by necessity. Under these conditions it is possible to skip an account or a service in an account. Provision in the device for automatic checking of skipped or missed meter readings and display thereof, eliminates these common type of errors. None of the prior art disclosures provide for such a tool.

Meter readers often keep special notations and special instructions in their meter books and also update existing data such as a new location of the meter or a new meter serial number. Prior art disclosures do not provide means for updating, varying or adapting the record in the field as different conditions arise, nor do they have provision for storing readings of new accounts and identifying their position in the sequence for future inclusion in the route record. The result is a less efficient data gathering system, and definitely, an inefficient total system of record keeping.

Reporting of problems for remedial action is an important task assigned to a meter reader. Broken glass, seals, detection of leaks, tampering etc. are cause of hazards, liability and financial loss to a utility.

Reed, Etter, Azur rely on restricted numerical codes to describe an item to be reported. Since the number of reporting problems is large, this method is inadequate because it cannot encompass the range of problems encountered. Their systems restricted the number of reporting types available to the meter reader to be cut down to about ten and only one type could be stored at a time. Newell bypassed coding and reference to a list, by providing ten keys on the keyboard suitably labelled, which is also restrictive.

This invention provides for an unrestricted number of reporting problems to be entered by the meter reader and allows for visual verification of the entry in text form.

It is a norm in the utility industry to enforce verification of the meter reading, since, erroneous readings lead to customer complaints, poor public relations and very costly rereads. In most utilities, the meter book contains the previous entries not only for record keeping, but also for verification. In many utilities, the meter reader subtracts the previous recorded reading from his reading to fill a column of consumption which becomes an easier method of verification. A scan of that column quickly draws attention to an off-reading which is tantamount to a mental HI, LO limit check. In addition, the data processors, upon receiving the readings, carry out checks, and if off limits, the account is flagged for verification.

The inclusion of high and low limits in a data collection device, has the purpose of only drawing attention that the reading is off, but does not necessarily ensure a correct reading. In this invention this concept is taken a step further for assurance of the integrity of the data.

Management control on the productivity and efficiency of meter readers is a desirable tool which has been included in this invention. This inclusion of the time of reading and storing of the sequence in which meter reading are taken provide means to constantly update the route patterns as required by changing conditions in the field.

Memory capacity is a serious and common limitation to all solid state hand held data collection devices due to size and cost. To optimize the use of memory and thereby compress more data for a given memory capacity, a novel organization structure of data and apparatus is disclosed.

Kashio U.S. Pat. No. 4,031,515 describes a system of data compression in which same item words in adjacent records are replaced by a special character, once the first has been stored. In this manner equal words of n characters, are cut down to one, until the item word changes. Kashio's invention is successful for one type of application, in which the data structure in terms of the number of fields is fixed, and compression takes place if the files with identical type fields are contiguous. Otherwise compression does not take place.

This invention describes a different system of data compression in which equal type data in the files are totally suppressed and do not depend on contiguous record positioning within the data stream. Compression always takes place. This invention is adaptable to a wide spectrum of applications.

In conclusion, the weaknesses discussed for meter reading, apply for the general class of applications involving man-machine communications and the introduction of controls to improve and maintain data collection efficiency. Many of the features of this invention truly fill the need for a universal data collection device, in which source data can be variable in field length and format and yet, storage and retrieval of data is obtained efficiently and reliably with simple key actuation. Such a device would have the advantages of the preprinted sheets, provide for any formatting desired and yet conserve memory through data compression.

SUMMARY OF THE INVENTION

The present invention overcomes the limitations of the prior art, portable data collection devices and in particular, devices for utility meter reading. This invention is a portable data collection device with keyboard, display, memory and an interface to communicate and transfer data to a computer directly or to a memory system, or via a modem for long distance transmission, to display data on a CRT terminal or other means and to print a hard copy of the data in memory. This device accepts incoming data modifies it, edits it, adds new data, verifies it and retransmits it to the source computer or memory system.

However, the invention due to its versatility, has unrestricted use in practically any industry or application requiring data collection or entry.

In a most preferred form of my invention, it is a method and apparatus for utility meter reading. In the preferred form of operation, Route data is transmitted to the data collection device from a computer or memory system and verified by the data collection device.

One of the features of my invention, is the unqiue method in which each subscriber and each meter is identified in the record and retrieved by the device. In its preferred form, the route data consists of one or more Route headings, District headings, Street headings and series of single account buildings and multiple account buildings within each street.

Yet another feature of my invention is that in each account, one or more services are preferably listed, such as electric, gas, water, demand, manifolds peak etc. related to different types of meters in use, and selectively displayed by the device.

In the prior art, only the street name is given and identified and is followed by a building number and a meter number. No provisions exist directly to identify the street or district or route by name or to identify the type of meter in question, such as gas, water, electric etc. to easily locate it or to arbitrarily select it.

Yet another feature of my invention is that the device provides for random selection of any field in an account file, by activating a specific key on the keyboard.

In the prior art, the data in the record is sequentially addressed and displayed, whereby to display or store data in any field, one has to step through and display previous fields.

Yet another feature of my invention is that the device responds to a record, which may be variable in format, since each subscriber or account may have any combination of services and each service type may have variations in any or all of its preferred associated data, such as the number of dials in the meter, the meter constants, the meter serial number for identification, the key number, if the meter is locked, the meter location, any hazards encountered or any instructions to the meter reader related to the particular meter or account.

Yet another feature of my invention is the acceptance by the device of field reports via the keyboard, related to any maintenance requirements typically broken glass or seal, or leaks, any corrective action required, such as tampering or reasons for not recording a reading and the format may preferably be variable if explanations are desired.

Yet another feature of my invention is the acceptance by the device by means of the keyboard of a new key number.

Yet another feature of my invention is the acceptance by the device by means of the keyboard of a new meter constant and/or meter serial number if the meter is modified or replaced.

Yet another feature of my invention is the acceptance by the device via the keyboard of a new location of the meter, new hazards or changes in hazards, new or changes in customer instructions preferably in variable form.

Yet another feature of my invention is the acceptance by the device via the keyboard of any New Accounts or meters not included in the original record and the preferred ability to position the new entry in the correct place in the record sequence, for later file update.

Yet another feature of my invention is the acceptance by the device via the keyboard of survey data on each account.

Yet another feature of my invention is the acceptance by the device of a report regarding the total route ex: Why the route was not completed.

Yet another feature of my invention is the acceptance by the device of a meter reading, character by character, via the keyboard selectively, either left to right or right to left. Meter readers have their preference, and are more efficient reading a meter in the form they are used to. In the prior art no such feature exists.

Yet another feature of my invention is the unique manner the device responds to a meter reading entry. Each meter reading is always stored in permanent memory and preferably verified with at least one individual high and low limits, provided by the computer in the record. The verification of readings against projected limits is a long established industry use and is a requirement to assure integrity of the reading. In the preferred form, if the reading falls outside the limits, the reading is stored in memory and the meter reader is advised, via the display, with a flashing message to repeat the reading, whereas if within limits, a read OK is displayed. Automatic stepping to the next account is not done, since other pertinent data might be required to be stored or displayed and more importantly, the meter reader might want to check for missed accounts prior to leaving say, a multiple building.

Yet another feature of my invention is the provision of a tally of the number of times a reading is entered. The tally starts at zero, prior to any readings entered and the number is automatically incremented with each entry. The tally provides assurance that the meter reader did in fact reenter a new reading by a necessary control. This tally is stored in each account and is transmitted with the meter reading.

Another aspect of my invention is the provision in the meter reading device of management tools and controls. An optimally sequenced routing path, streamlines and speeds up data gathering. A list of buildings by sequential street number is not necessarily an optimum path. In any case, in developing areas, the situation changes and for this and other reasons, the meter reader may deviate from the actual sequence prescribed by the device. Hence in the preferred form, the data collection device automatically keeps track in memory of the sequence the buildings were visited and as a result the computer can, if required, selectively reshuffle the route listings for an optimum sequence.

Yet another feature of my invention is the provision in the device for time studies. In the preferred form, the data collection device automatically stores in each account record, the time of day the readings are taken for later analysis.

A difficulty which exists in the prior art, is the sequential form the accounts are presented to the meter reader. If for any reason, such as flooding, or if local conditions force the reader to change the sequence or direction he is moving in, and say, start on another street, the reader has the onerous taks of stepping through the record account by account to find the new starting point.

Hence, yet another aspect of this invention, by its method and organization, in its preferred form the device provides listings of Routes, Districts Streets and buildings for quick location of a desired starting point. Particularly, in the preferred form, the meter reader can key a building number, or a unit number in a multiple account building to retrieve immediately data, or store data, in the selected account files.

In the preferred embodiment, the route record is segmented into files TABLE 3 to 14, and each file is prefixed with a particular character termed herein as a Reference Designator Field Format Code, TABLE 1, to identify the file. The files consist of multiple fields which are variable in length and contain particular information such as a street name, data pertaining to an account etc. Since there is no standardization of account records in the Utility industry, one of the features of my invention is to provide means in the device for customization by each Utility. Each type file in the route record, has associated with it in the device, a Field Format Table, TABLES 15A–K which is identified by the same Reference Designator Field Format Code as with its corresponding file. Each Field Format Table lists multiple entries corresponding to the fields in the associated file and the user specifies the number of characters each field will contain. The entry could be zero, in which case that field is deleted from the table and file. In this way, the device will respond to the preferred Route format of each Utility.

Yet another feature of my invention is the method the various files are organized with optimal duplicate fields in order to minimize memory usage. The objective is to transfer fields containing common data in various files to a higher level file so that the common data field can be shared by all lower level files within that structure. These options are provided to the user when the Field Format Tables, TABLES 15A–K are set-up. An exemplary illustration is the choice of upward level movement of the location of the meter, from each account file to the multiple building file, if certain type meters are physically bunched together as they are in some apartment buildings. In this instance, a substantial amount of memory space is thereby saved.

Yet another feature of my invention is the provision in the device for searching missed accounts in a street. As the meter reader completes reading an apartment or multiple building, he can request the device by key actuation, to search for any missed meters in that building and display the missed account prior to leaving the building.

Similarly at the end of the street, he can request a display of all missed accounts in the street, prior to leaving that street.

Yet another feature of my invention is the provision in the device by key actuation, to selectively skip accounts in the sequence if they have already been serviced. A useful feature if the walk is not carried out in the sequence provided by the computer.

Yet another feature of this invention is the provision in the device, by actuating the Summary Key, to display the number of accounts in the route and the number already serviced. This provides the meter reader a quick look on his progress.

Another aspect of this invention relates to the desirability for the device to display any hazards, locations of meters, instructions etc. in text form. In the preferred form of this invention, dictionaries are provided in the device to translate coded representation of the messages from the computer, which are utilized to conserve memory space, into full text for display. Similarly, in the case of record modification, the reverse is true, each character code keyed by the meter reader is translated into a word or part of a sentence on the display for verification of the entry.

In some instances, it might be desirable to transmit instructions or messages from the computer as text rather than coded form. One of the features of my invention, provided in preferred form, is to accept text and display it.

Yet another feature provided in my invention is to preferentially store via the device keyboard, changes in location and hazards, or new instructions, or field reports in free form, namely full text, using the alphanumeric keys in the keyboard.

Yet another feature of my invention is the provision in the device for display by key actuation, at a random sequence, of the status of the account, if open or closed, the account number, the meter number and constant, the meter reading and the number of readings taken, the individual services per account, the key number, the location of the meter, hazards and instructions and the field report for each account.

Yet another feature of my invention is the provision in the device for storing and displaying, by key actuation, a heading to the record, which includes the date and time the route was started, the meter reader identification and an automatic inclusion of the device serial number for record purposes.

To embody all the features described above and accommodate the variations thereof, from account to account, a totally different method and system organization is required from the prior art. This invention incorporates all the features discussed heretofore, and others disclosed further in the subsequent text.

This invention, while having most important application for meter reading is also useful for industrial data gathering, inventory control, property assessment, security services, transportation, delivery services.

This invention is also intended for scheduling the route of operators who turn-on and turn-off any accounts and incorporate in the device any data resulting thereof and also for scheduling the route of maintenance crews and to report back the results of their mission and any data required for the record.

It is also intended for survey applications by the utilities and others. As previously indicated, many features of the present invention are applicable to portable data collection devices other than for utility meter reading.

One for example is tax assessment, whereby assessors are sent to various addresses to assess the value of the property and return back with filled sheets to be transferred to the computer. In this instance, specific data on the property can be transmitted by the computer to the data collection device and the assessor stores in the device the variables on the property as basis for assessment.

In general the portable data collection device of this invention can be utilized in any application requiring a list of data sources to route an operator to the sources for transmittal and/or collection of data.

BRIEF DESCRIPTION OF THE DRAWINGS

TABLE 1. is an exemplary listing of the reference designator field format codes and their ASCII Code representation.

TABLE 2. is an exemplary illustration of the format of a record as received from the computer.

TABLES 3 to 13 are exemplary descriptions of the contents of the various files.

TABLE 14. is an exemplary summary of the various file formats used.

TABLES 15A-K are exemplary forms of the Field Format Table.

TABLE 15L is a Pointer Table for addressing the Field Format Tables.

TABLE 15M is a Service Identification Table for displaying the Service type.

Figure 1:
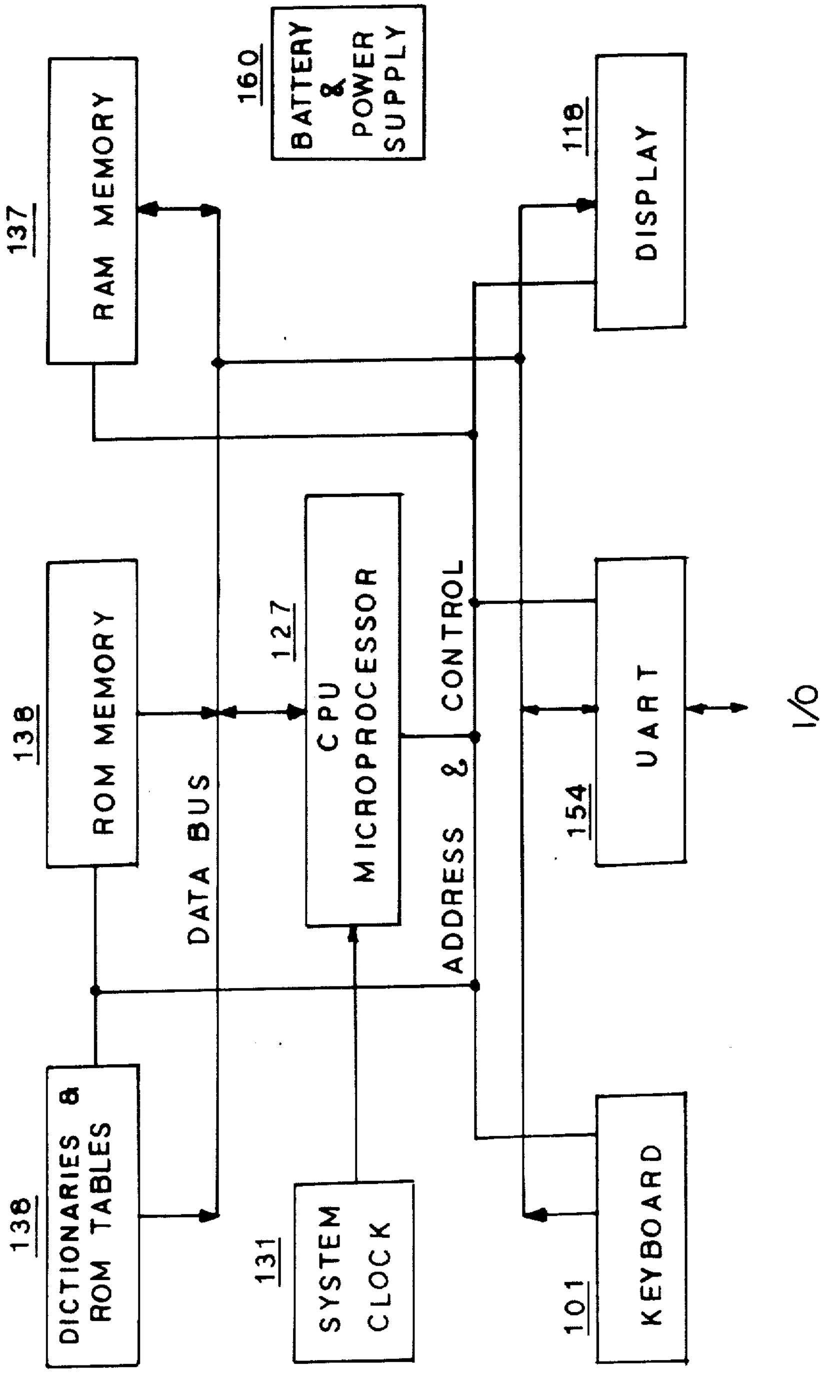

FIG. 1 illustrates in block diagram form the organization of the portable data collection device of this invention.

Figure 2:
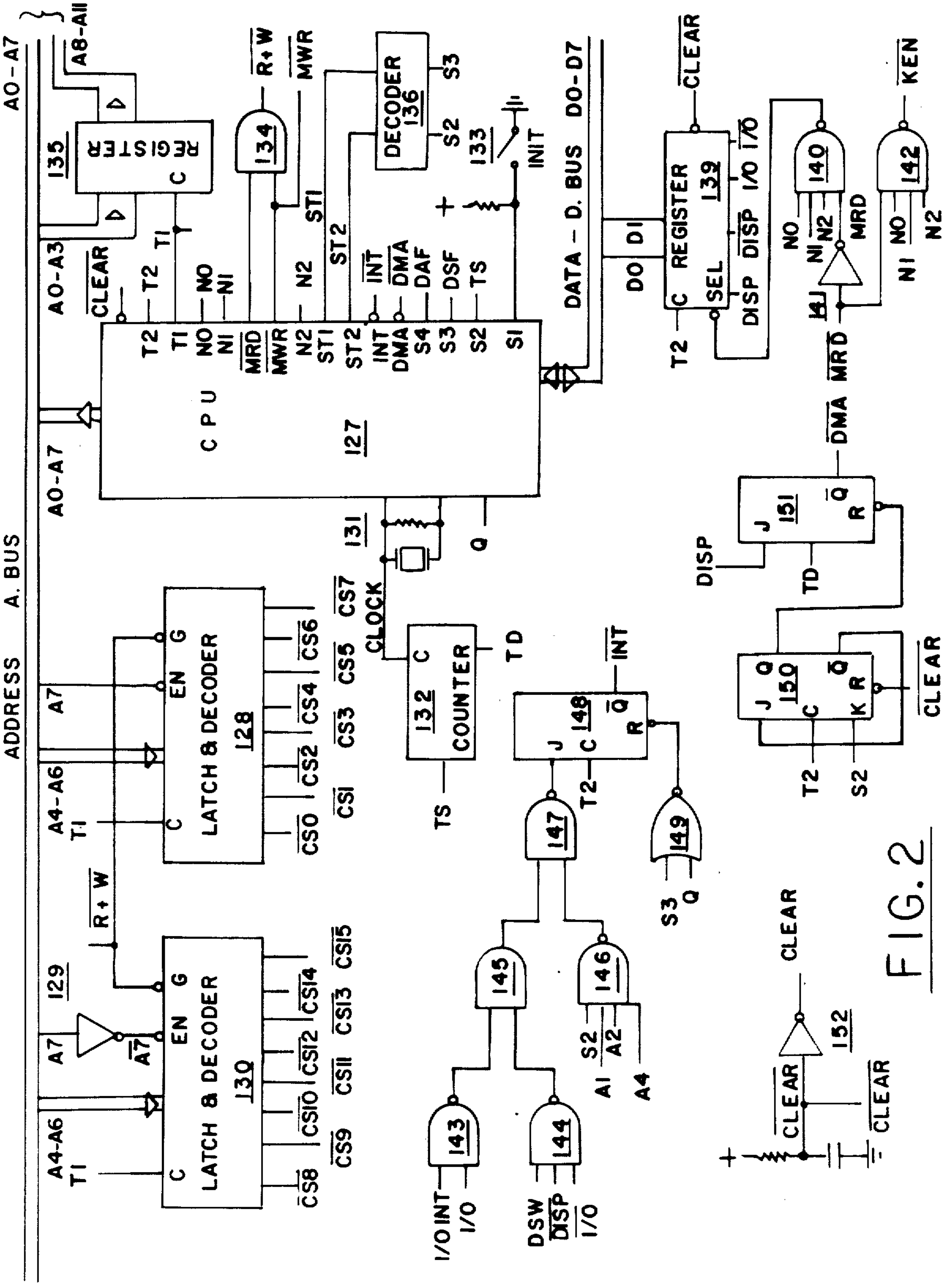

FIG. 2 comprises the schematics of the CPU, the memory addressing and control circuits and their interconnection to the CPU bus lines, the CPU control circuits, the keyboard control circuits and the timing circuits of the data collection device.

Figure 3:
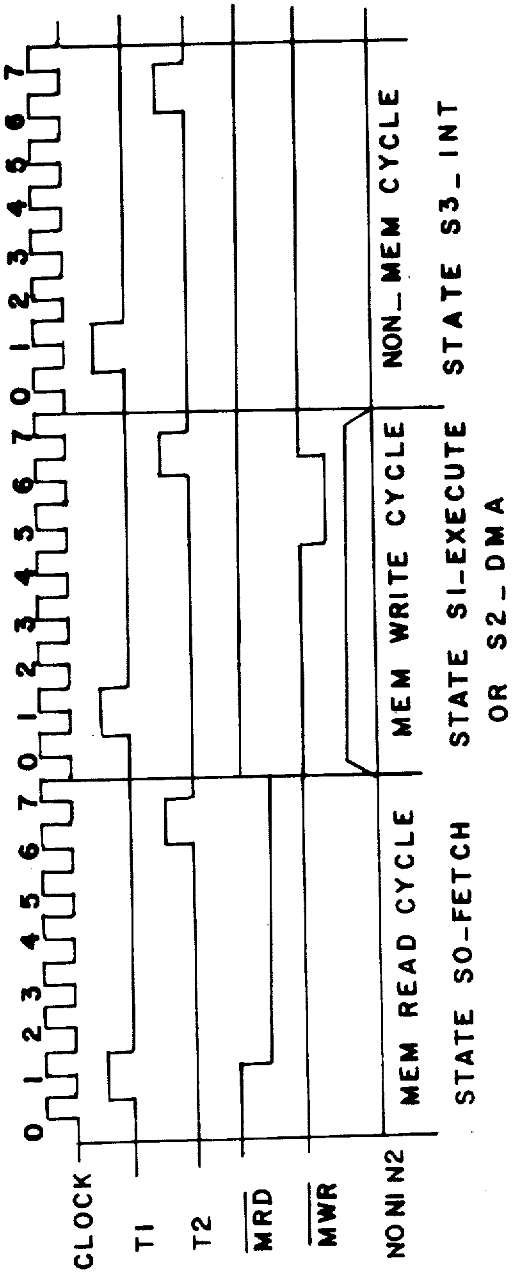

FIG. 3 comprises a timing chart of the basic CPU cycles.

Figure 4:
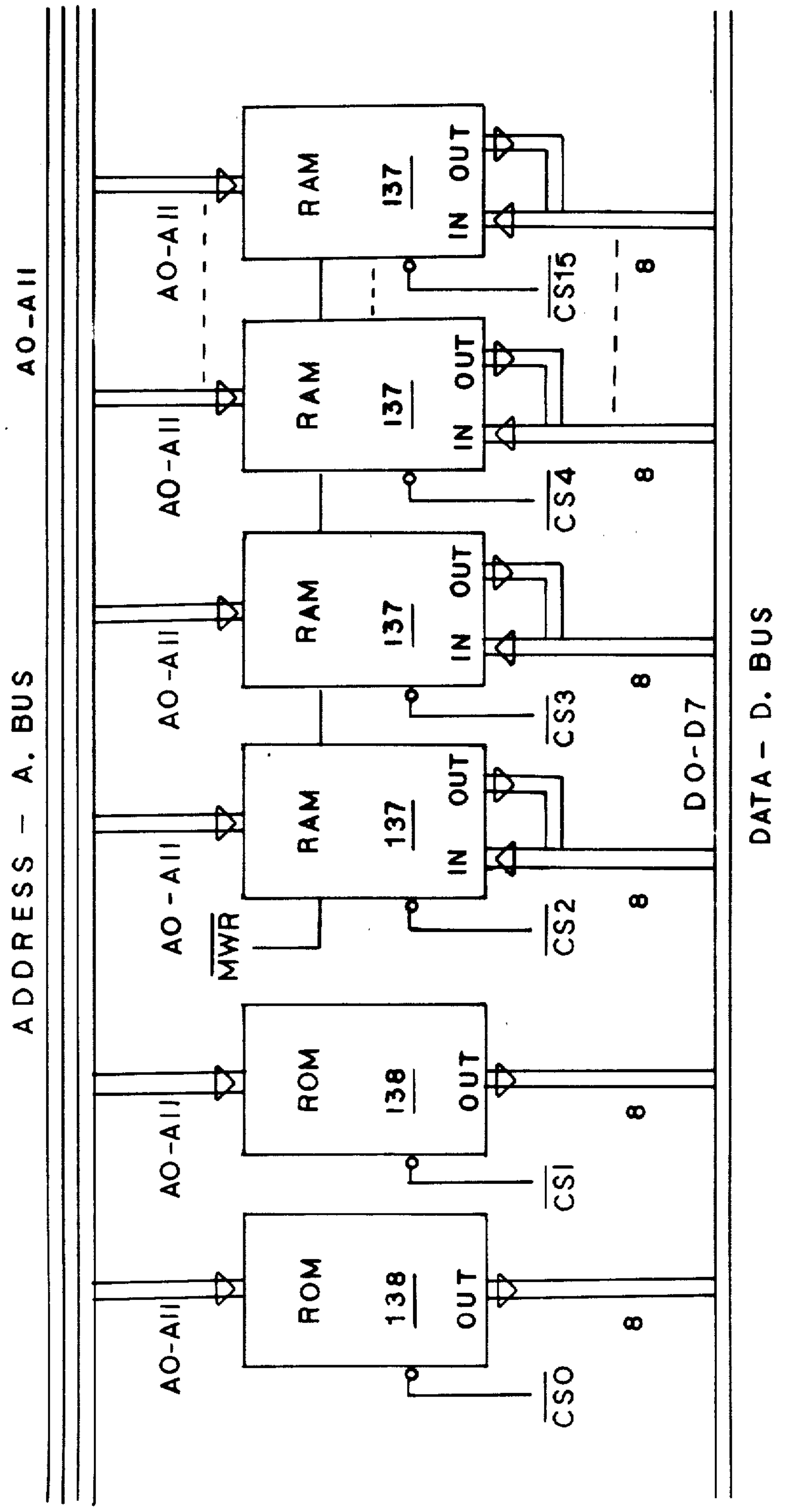

FIG. 4 comprises a schematic of the Read only Memories (ROM's) and Random Access Memories (RAM's) and their interconnections to the CPU address and Data bus lines.

Figures 5A, 5B:
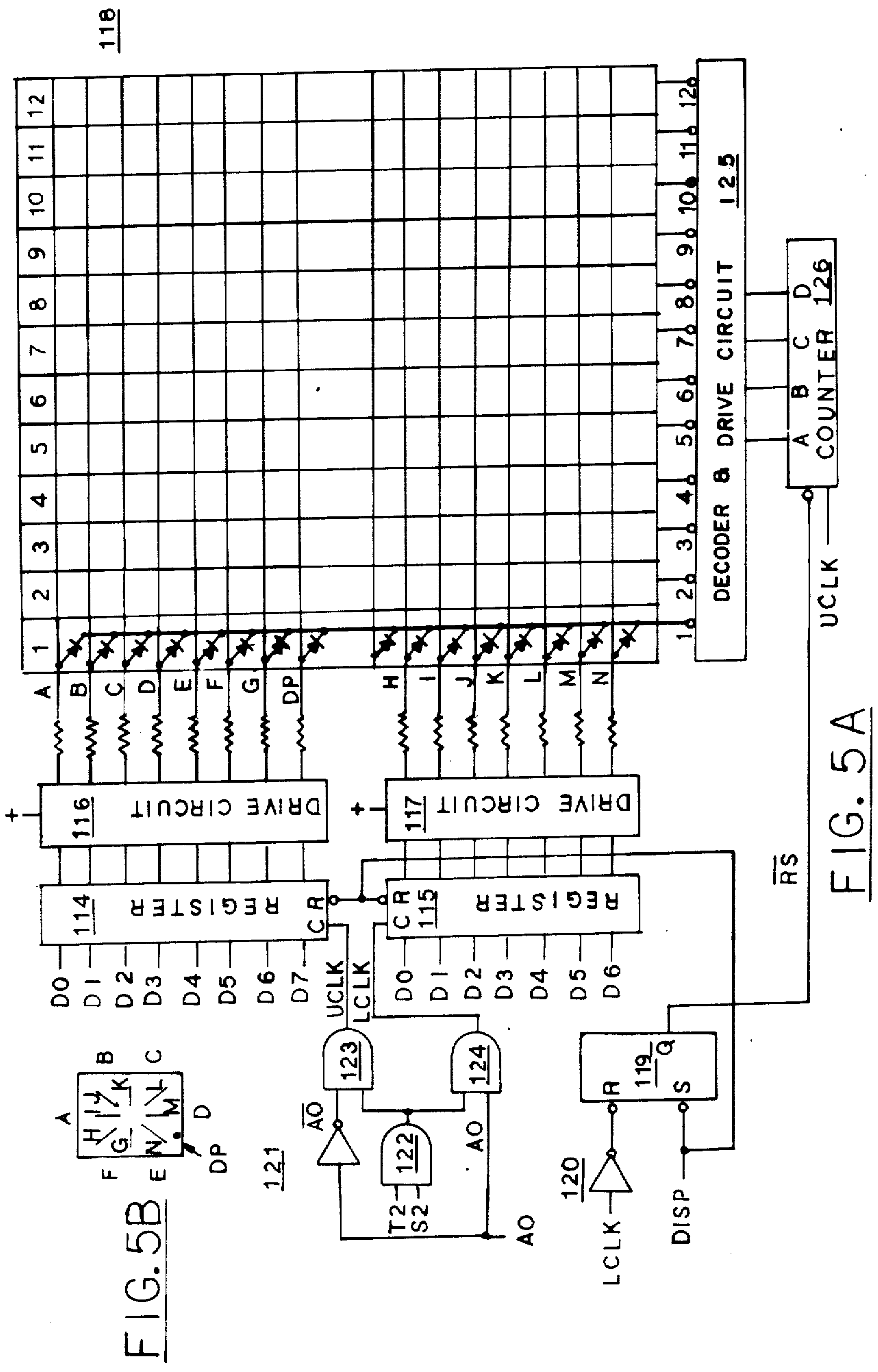

FIG. 5A comprises a schematic of the display and its interconnections

FIG. 5B illustrates a typical 15 segment LED display including decimal point and the identification of each segment.

Figure 6:
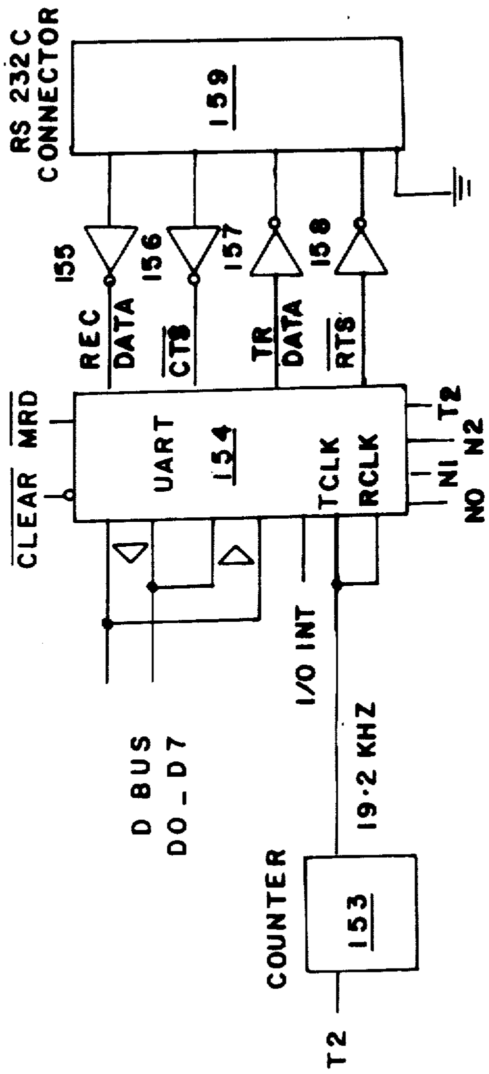

FIG. 6 comprises a schematic of the interface circuits.

Figure 7:
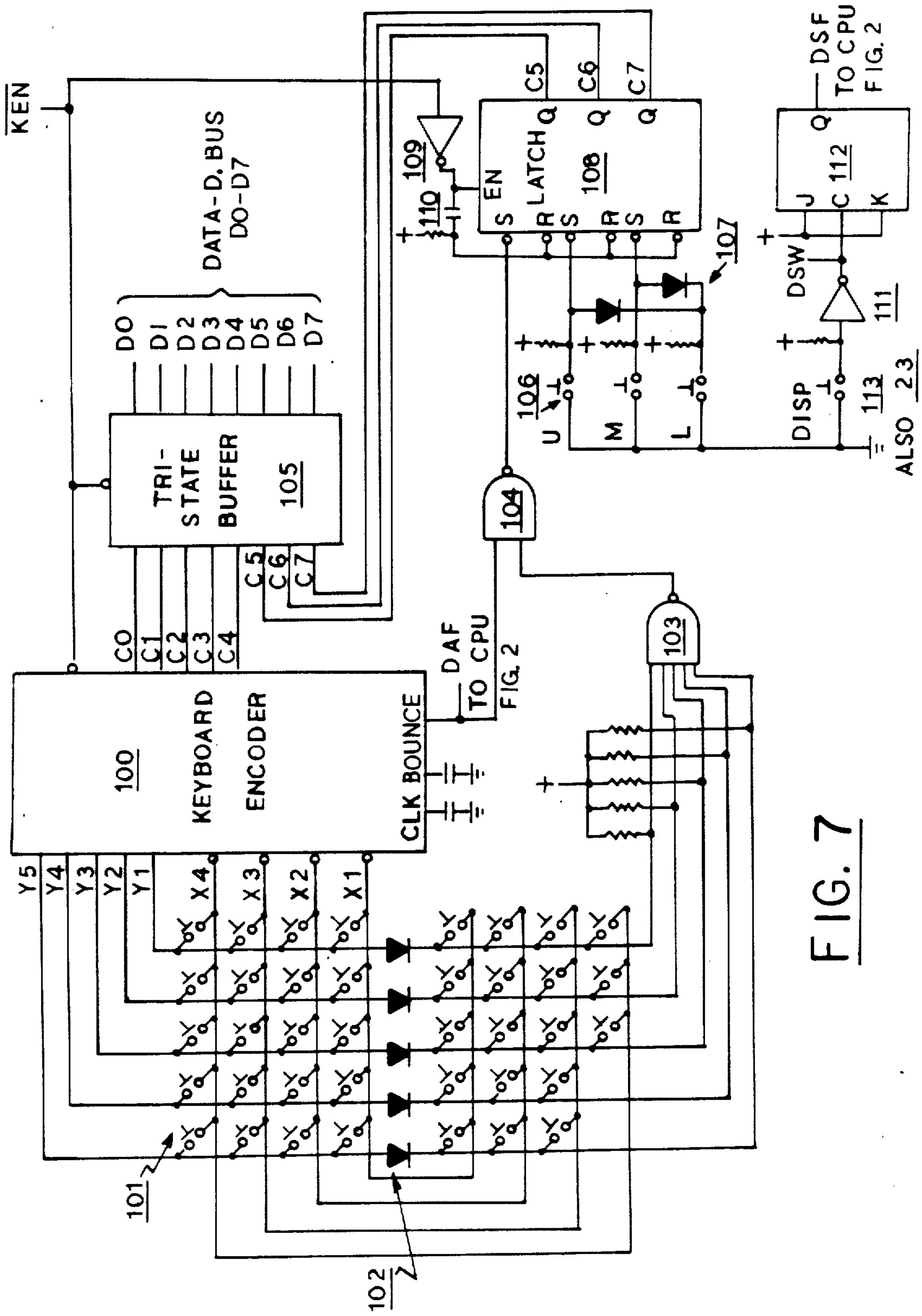

FIG. 7 comprises a schematic of the keyboard circuits and their interconnections.

Figure 8:
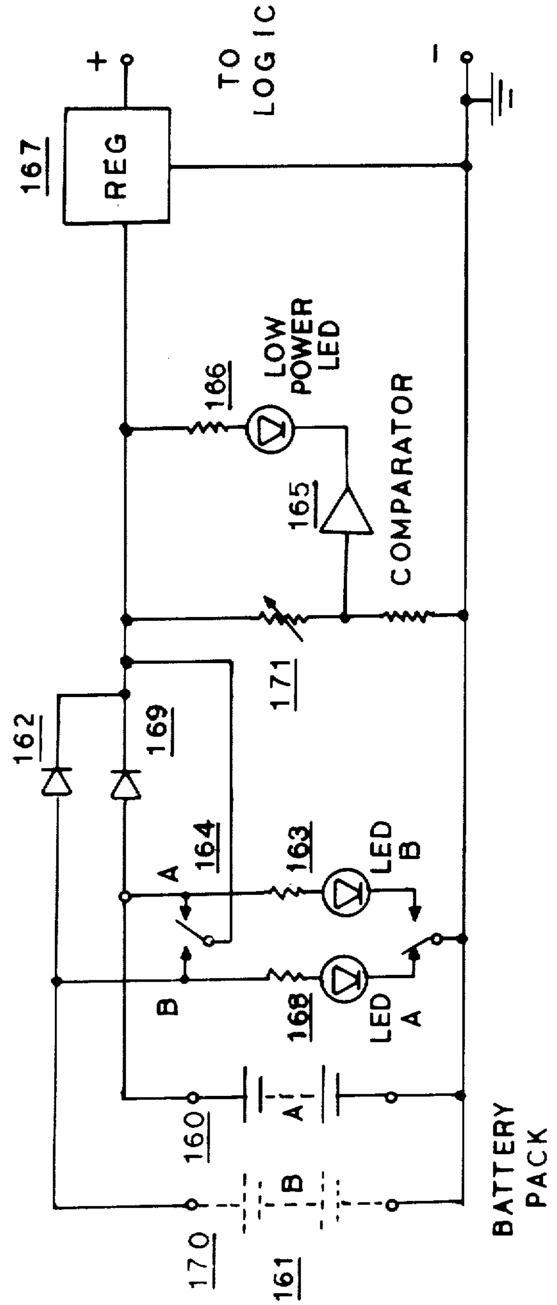

FIG. 8 comprises a schematic of the Power Pack, regulator, low power sense circuit and the battery replacement circuit.

Figure 9:
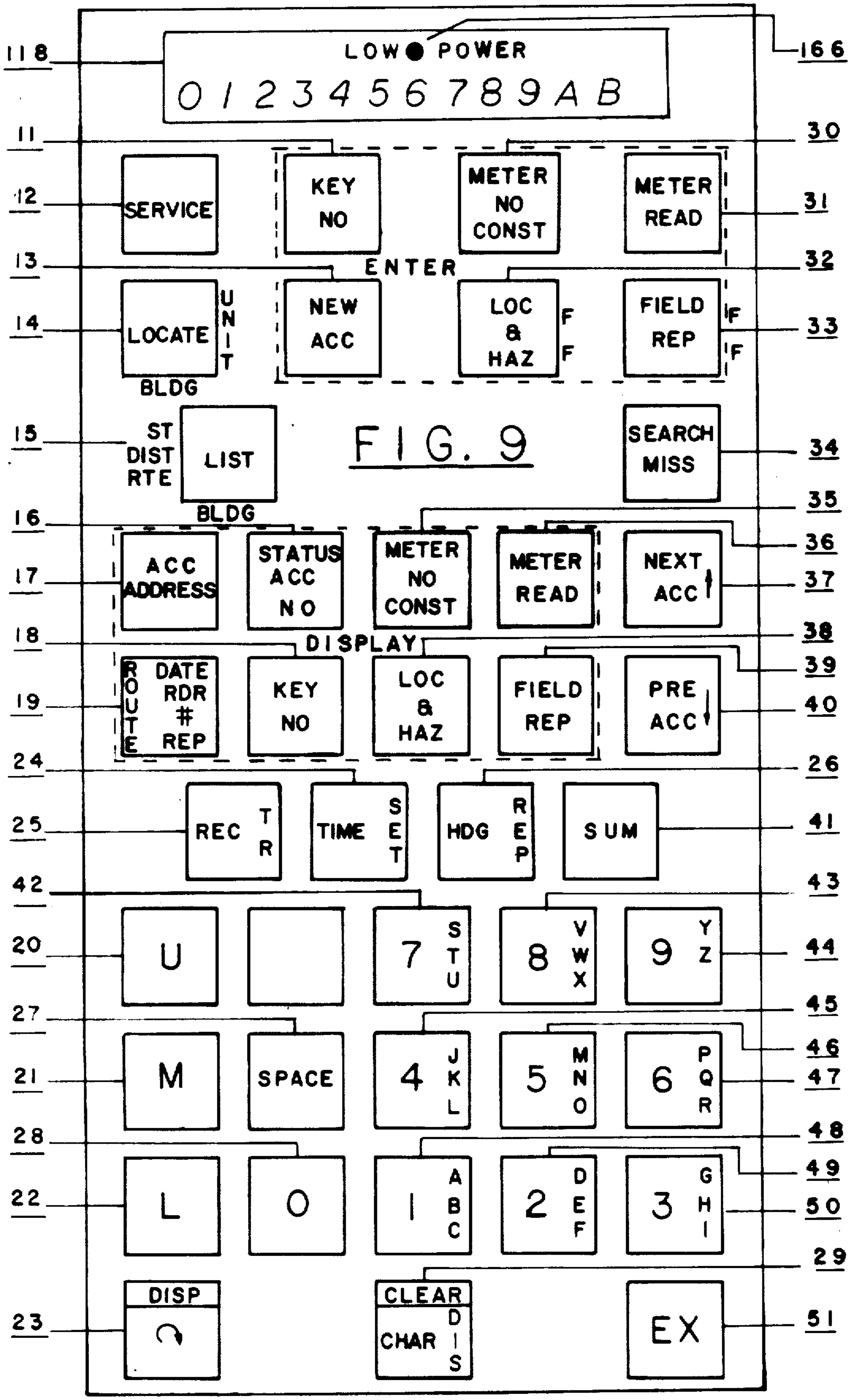

FIG. 9 is an illustration of the front view of the keyboard of the present invention. TABLES 16A,16B comprise a tabulation used in the program flow charts.

Figure 10A:
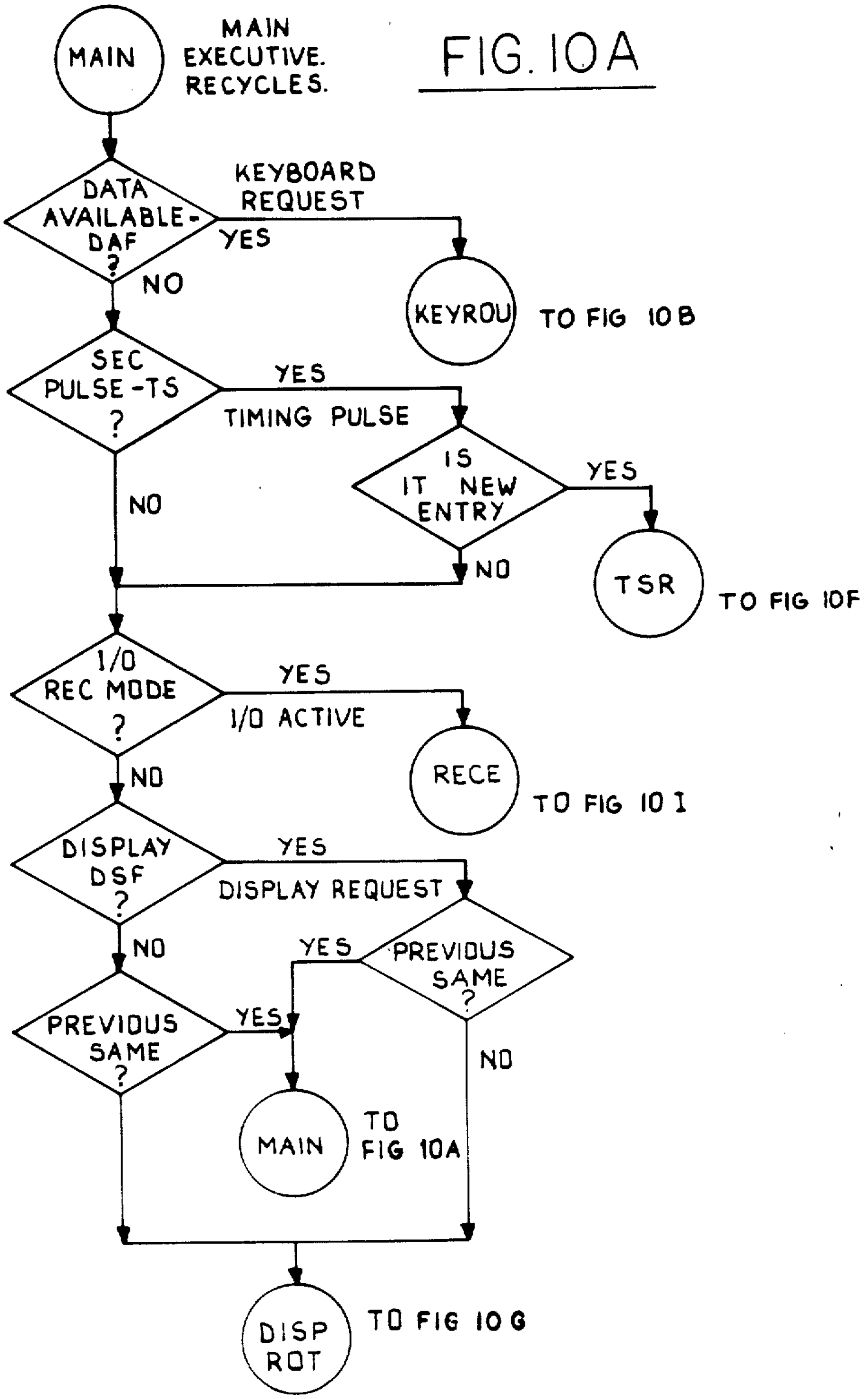
Figure 10B:
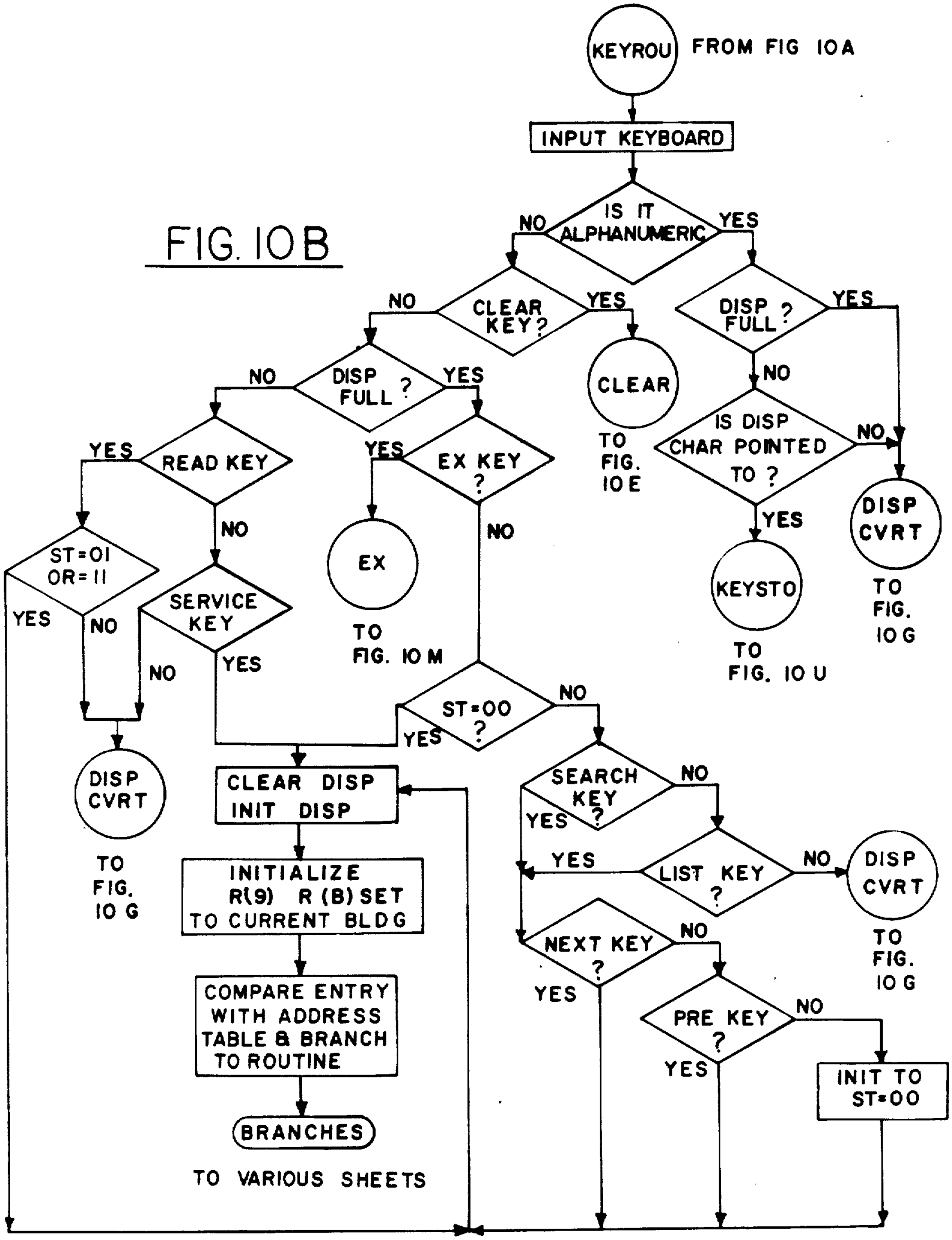
Figure 10C:
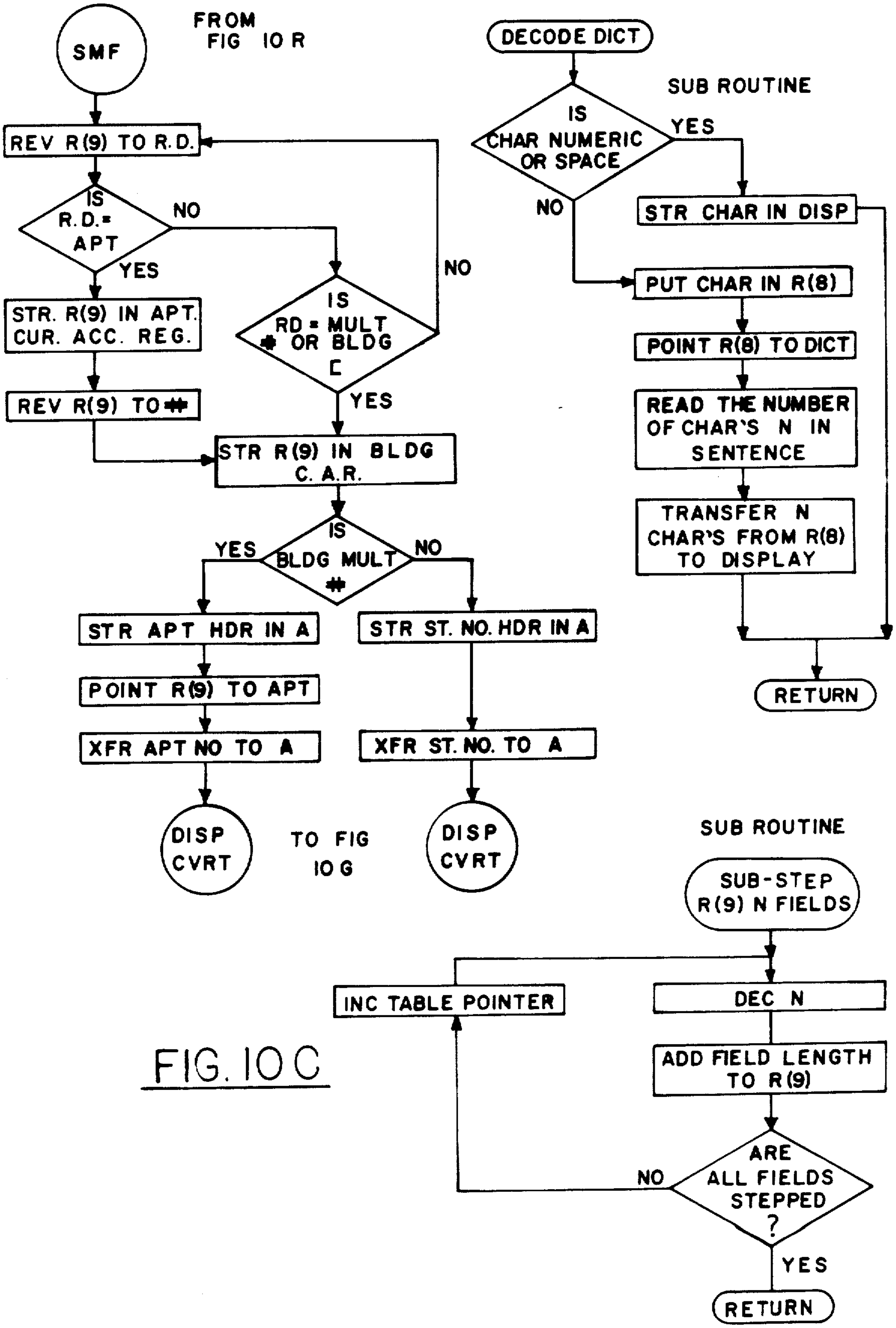
Figure 10D:
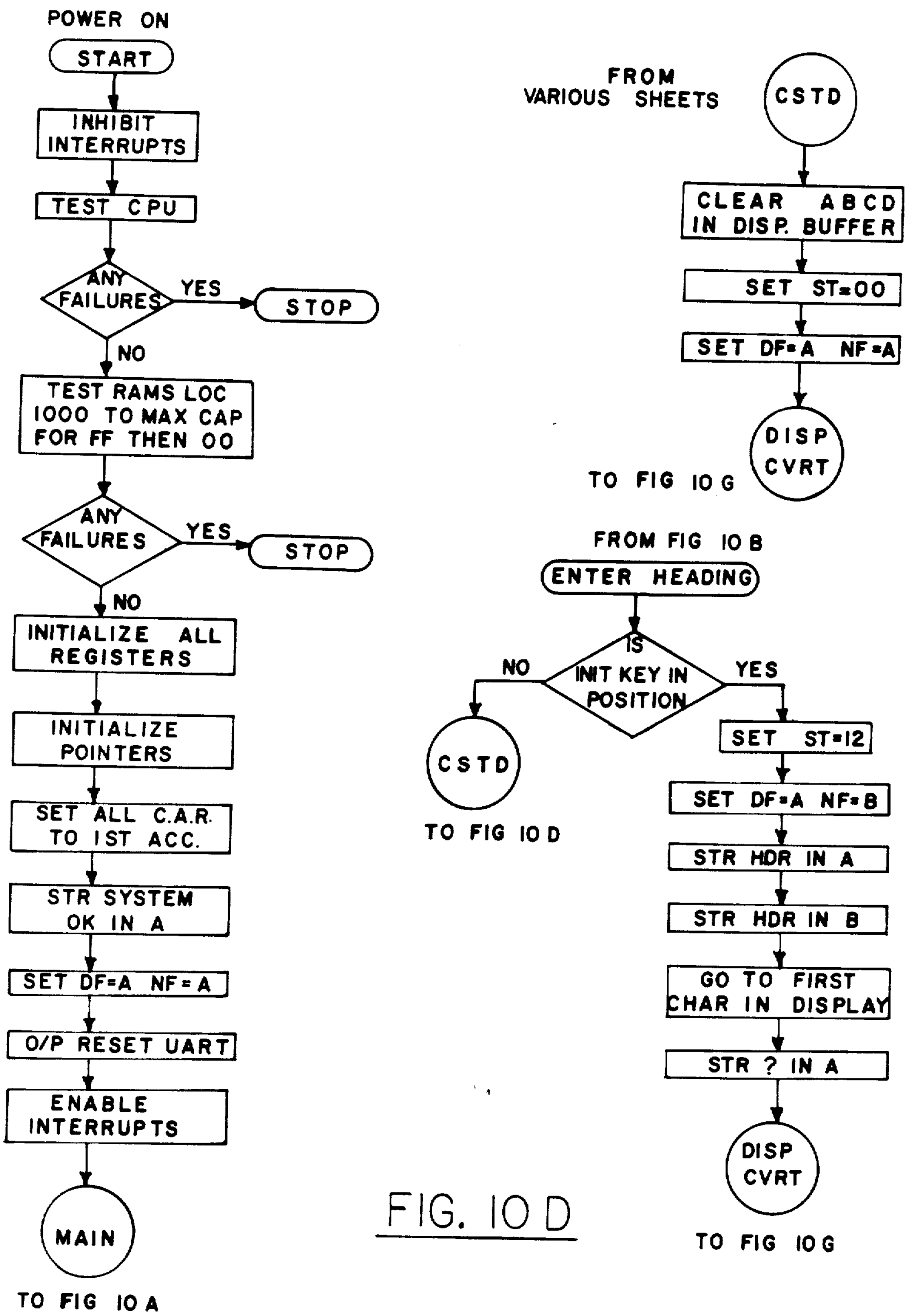
Figure 10E:
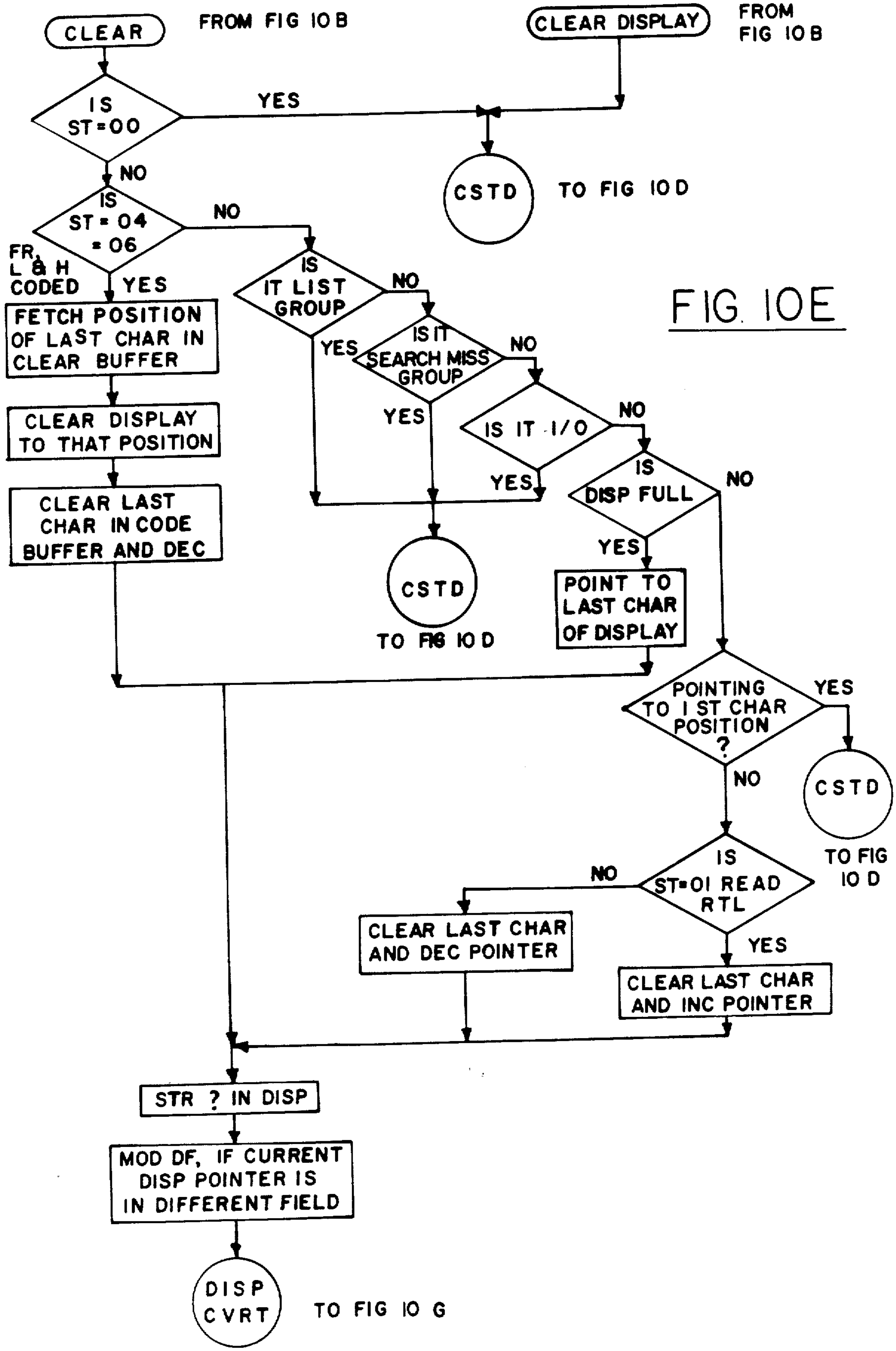
Figure 10F:
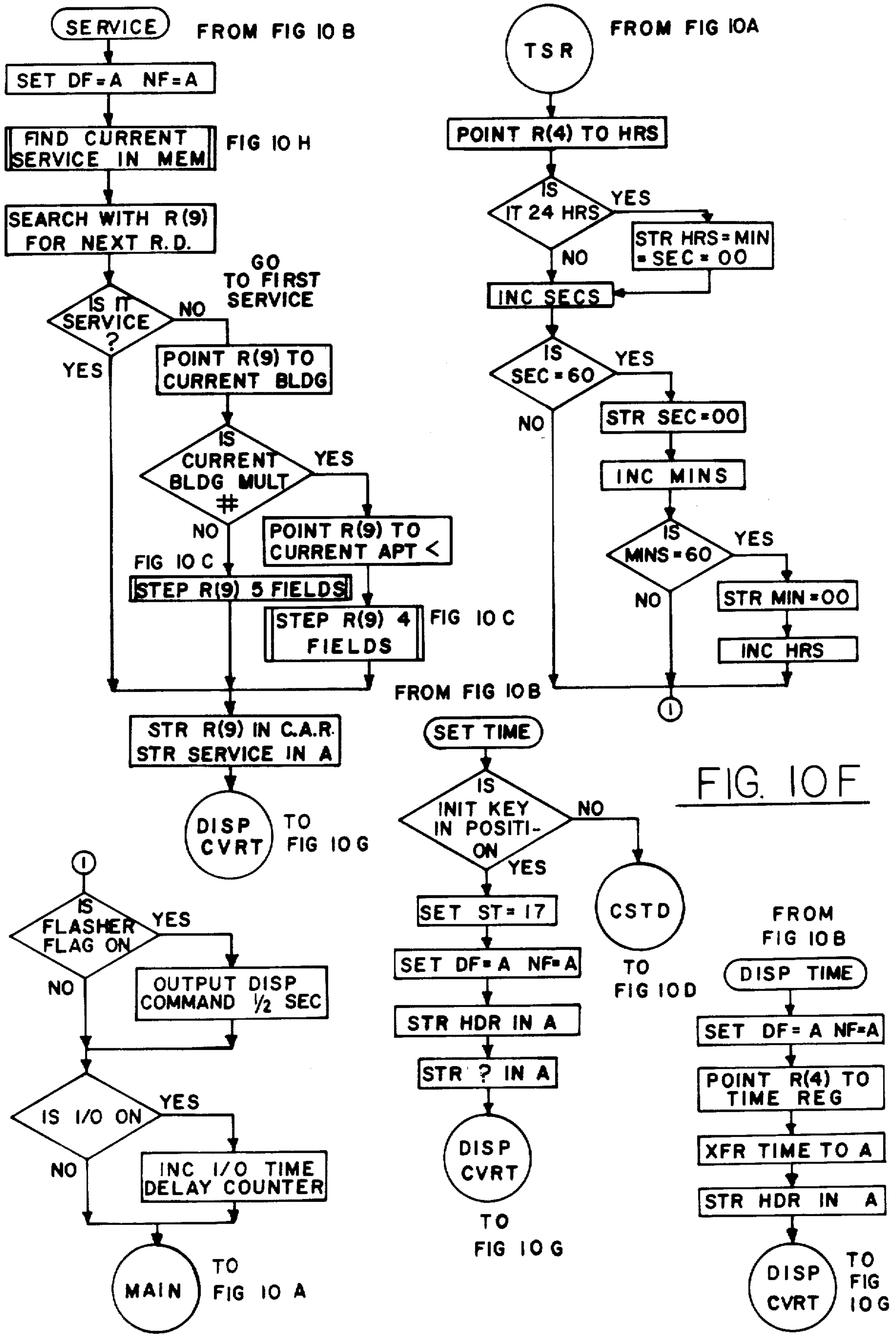
Figure 10G:
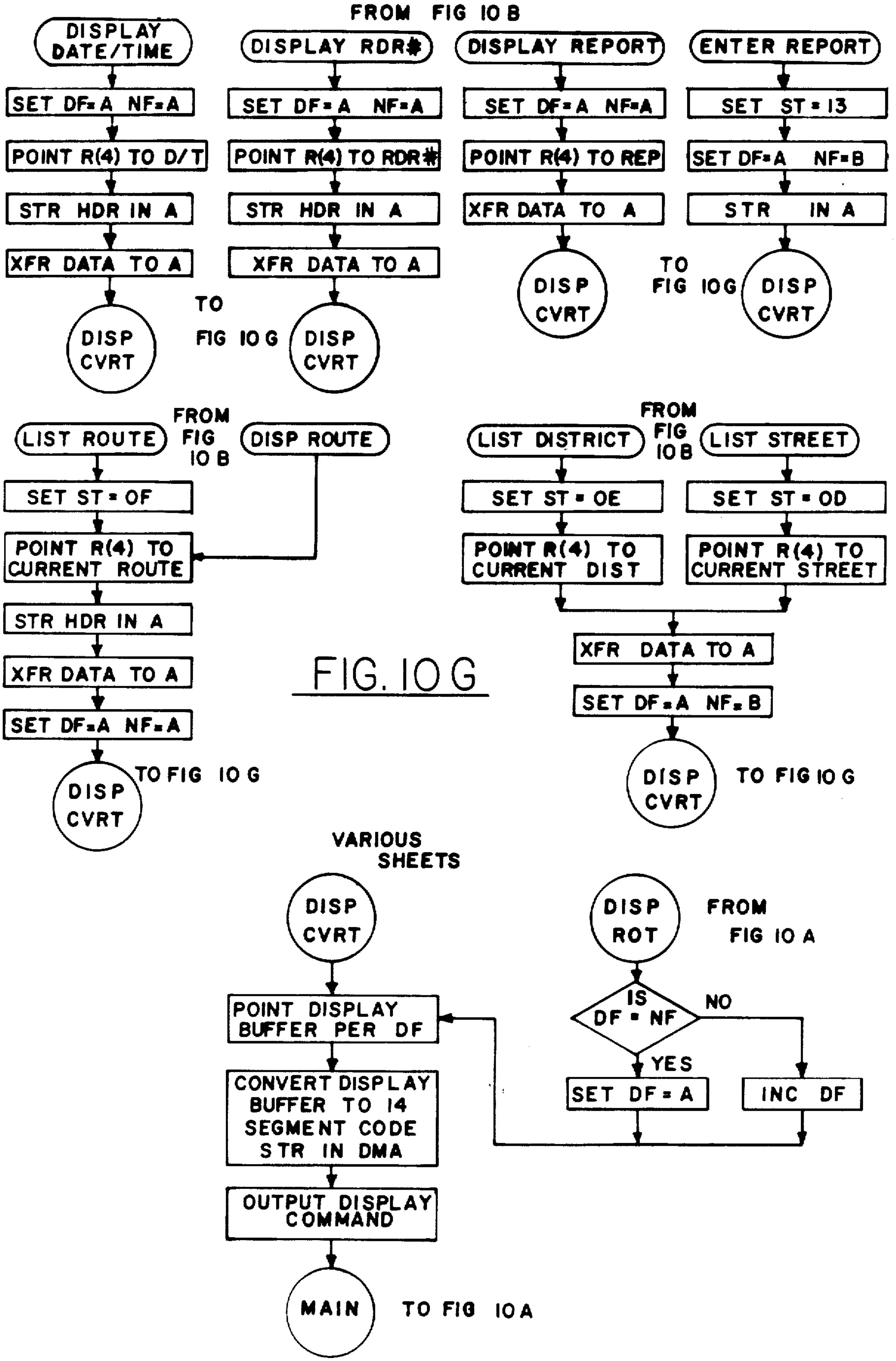
Figure 10H:
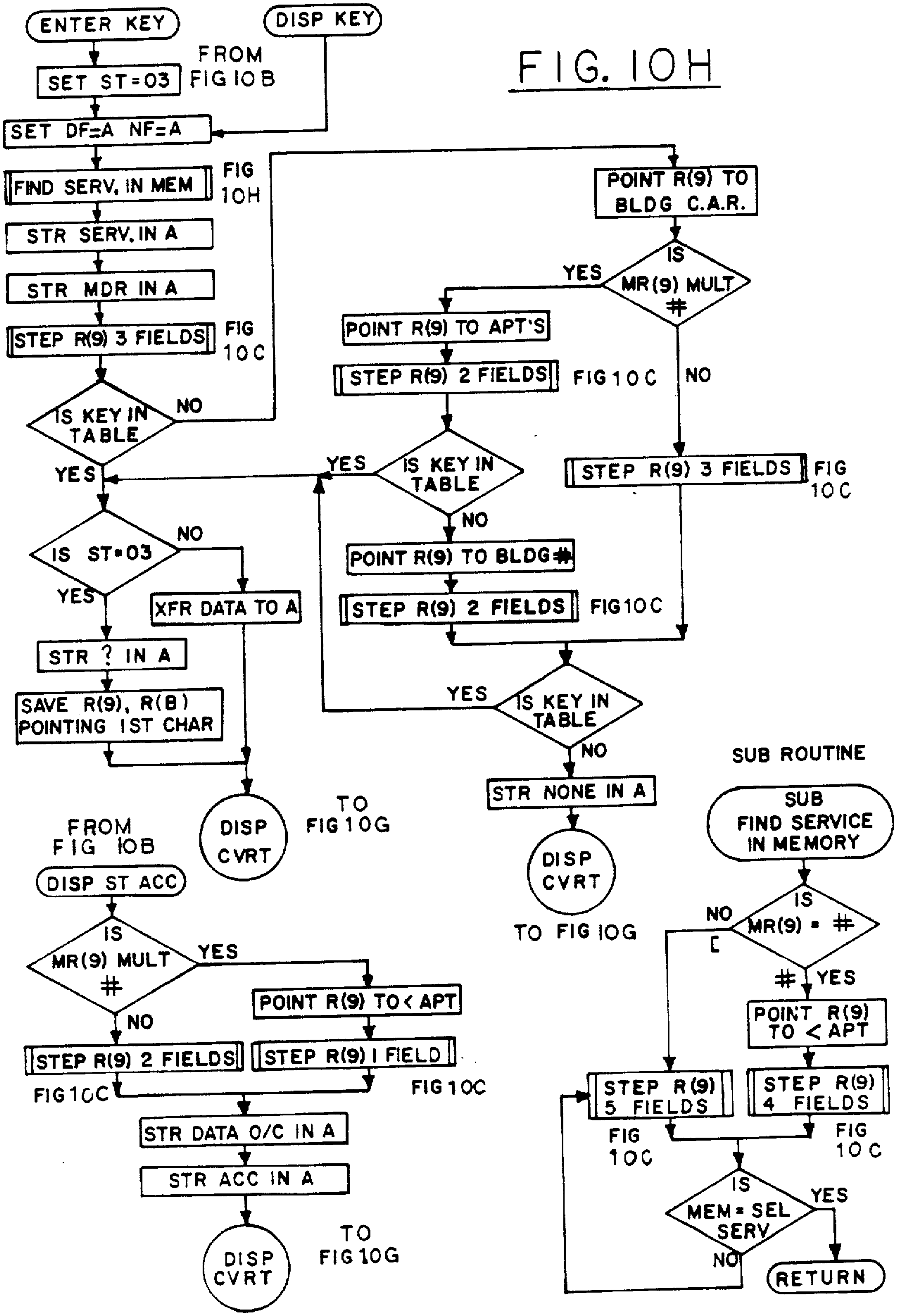
Figure 10J:
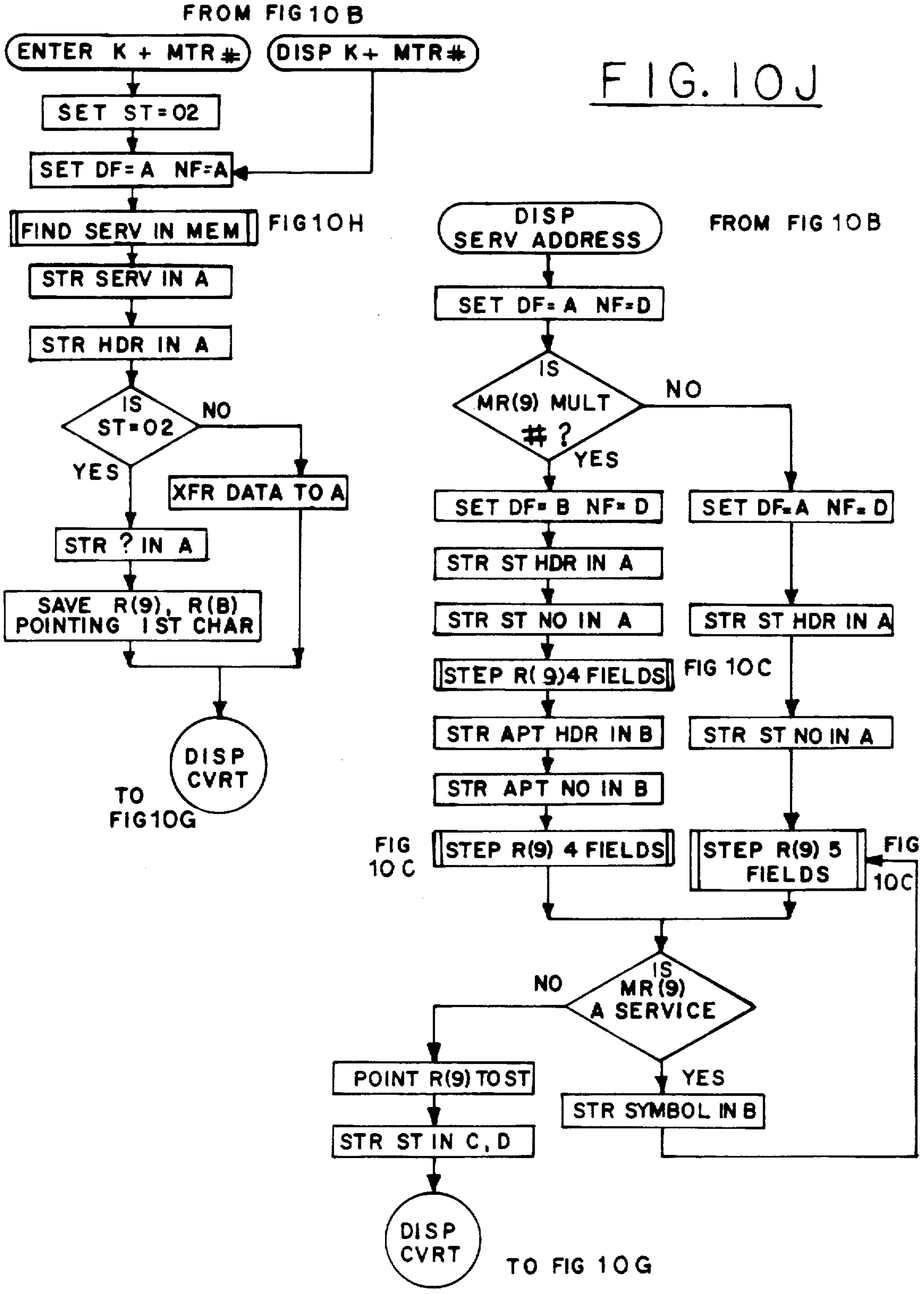
Figure 10K:
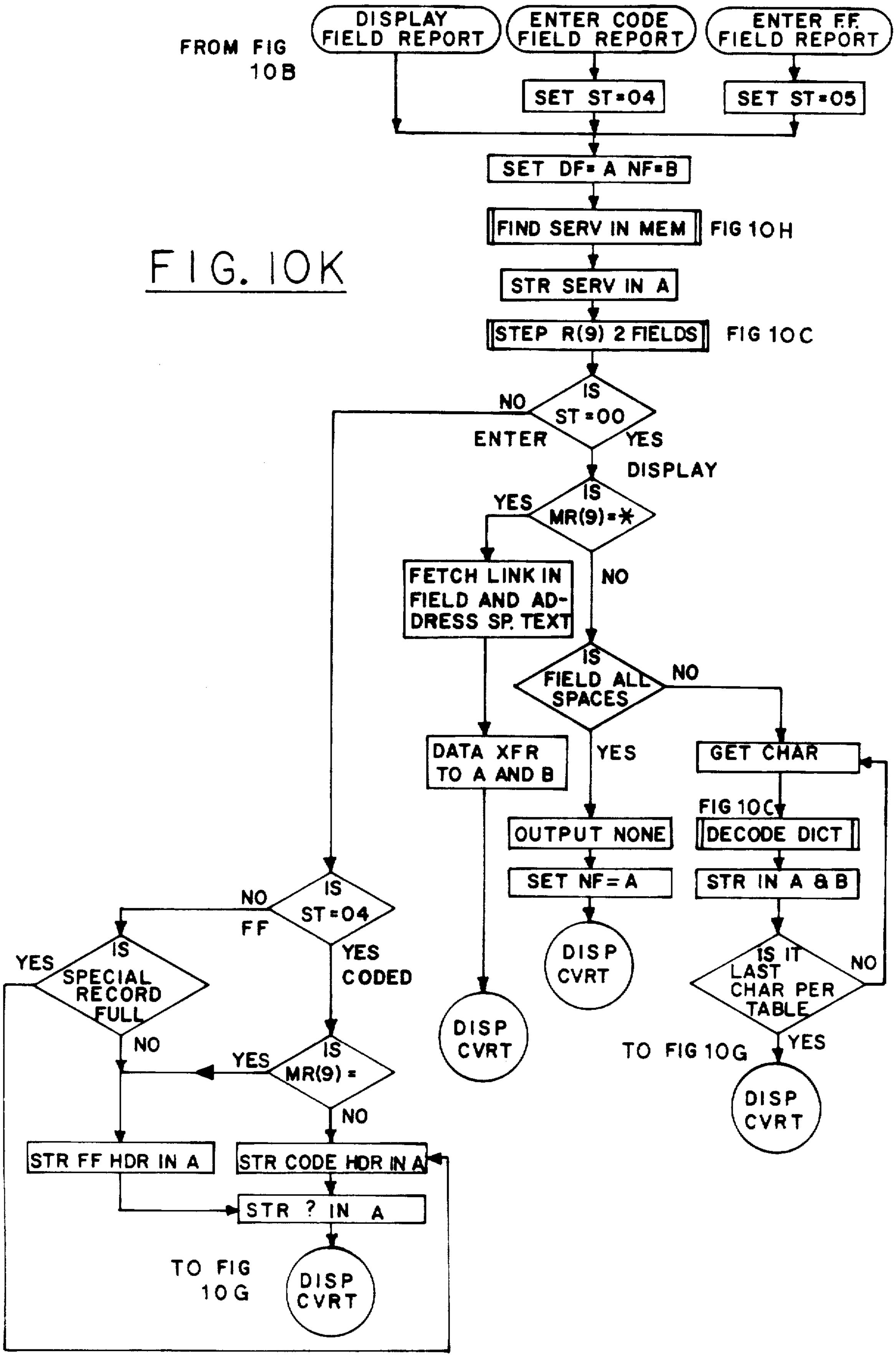
Figure 10L:
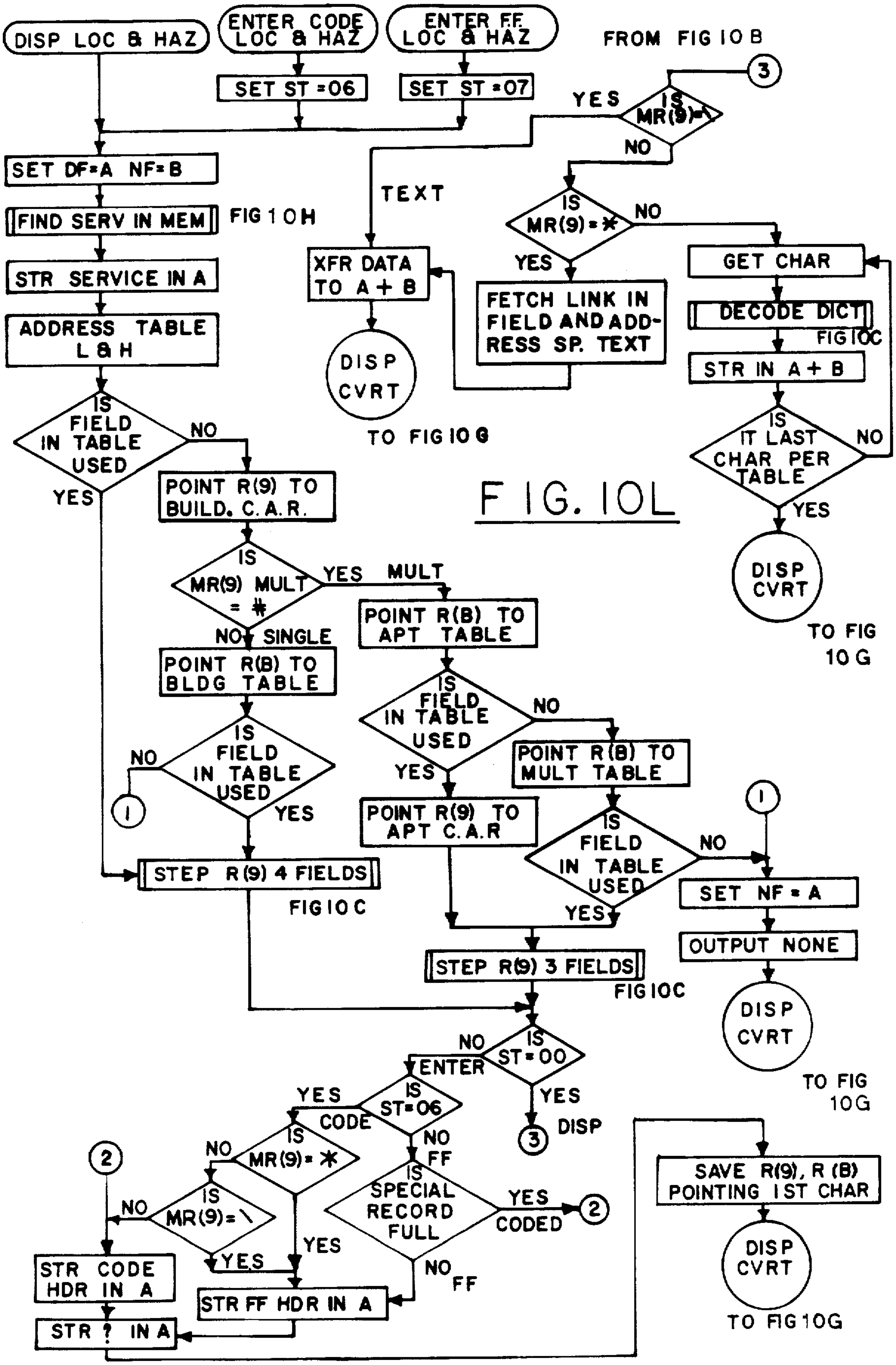
Figure 10M:
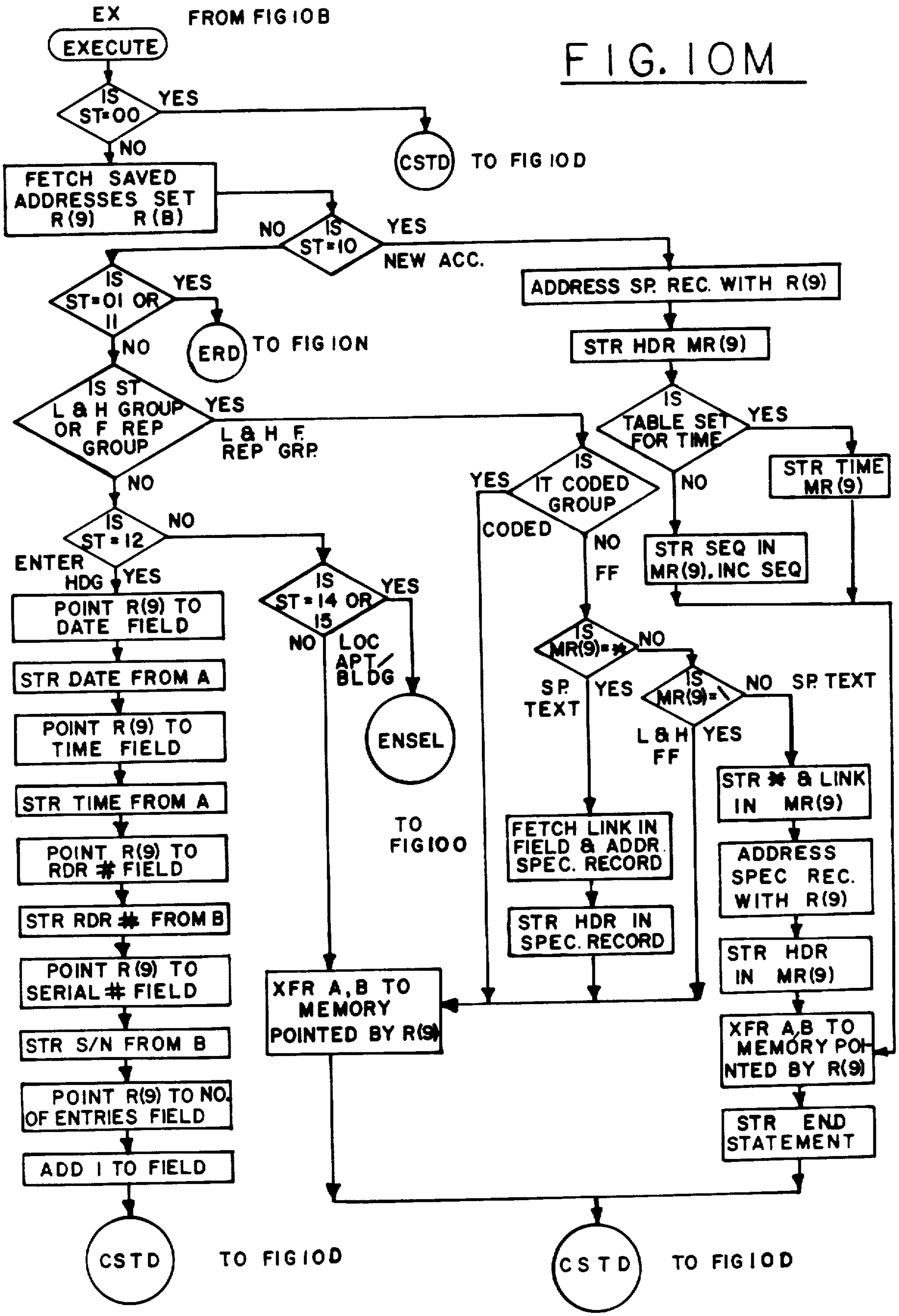
Figure 10N:
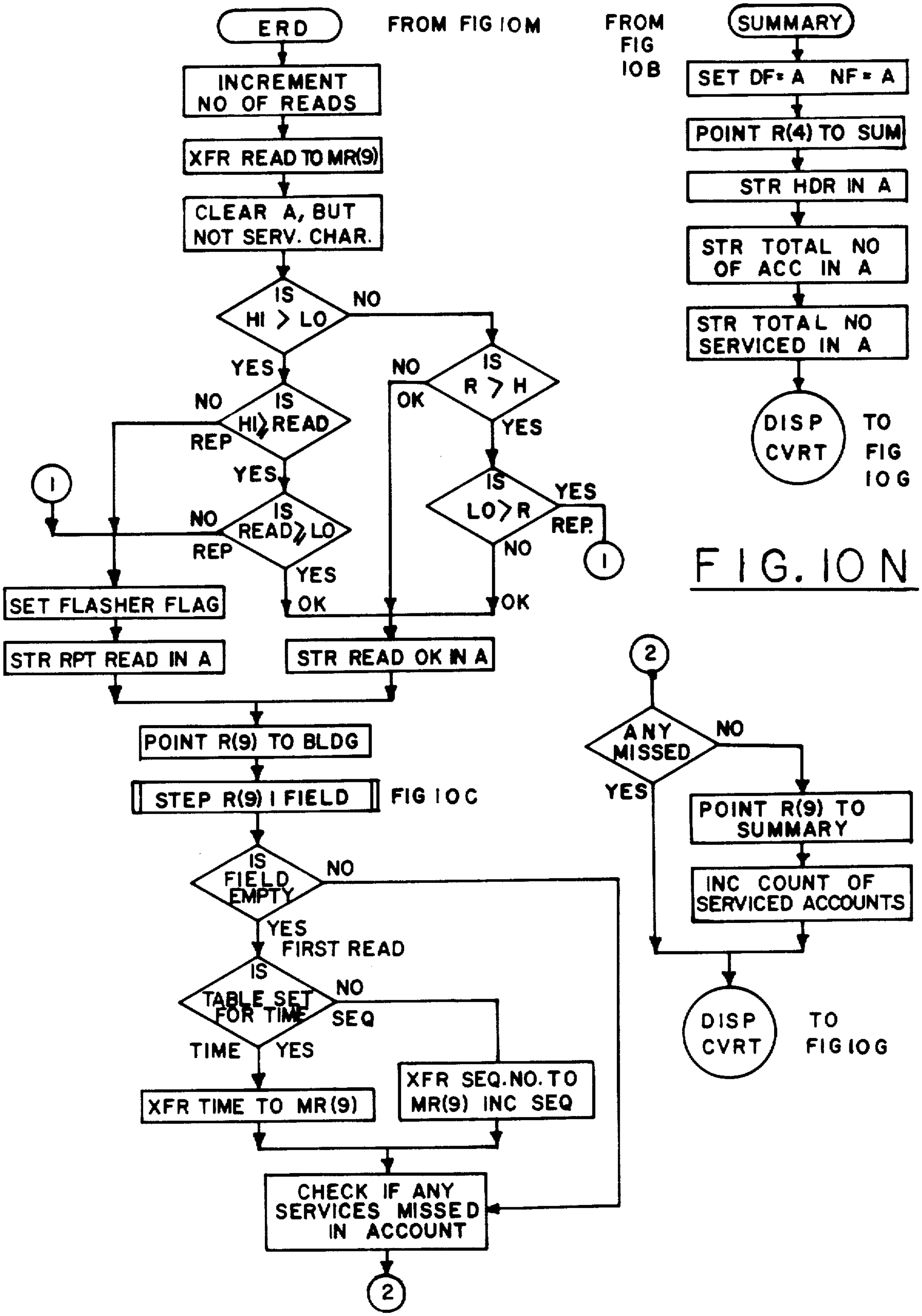
Figures 0, 10:
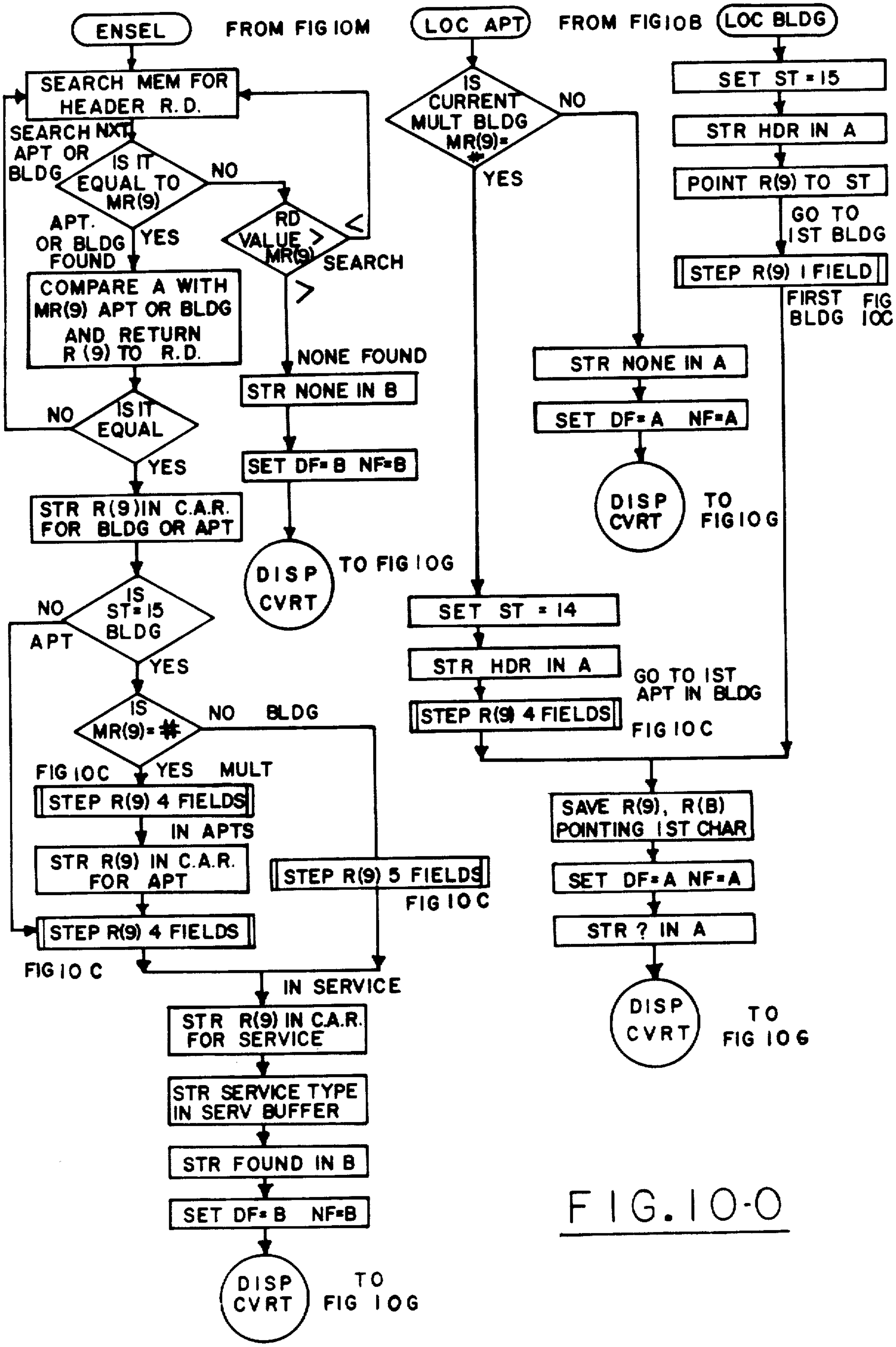
Figure 10P:
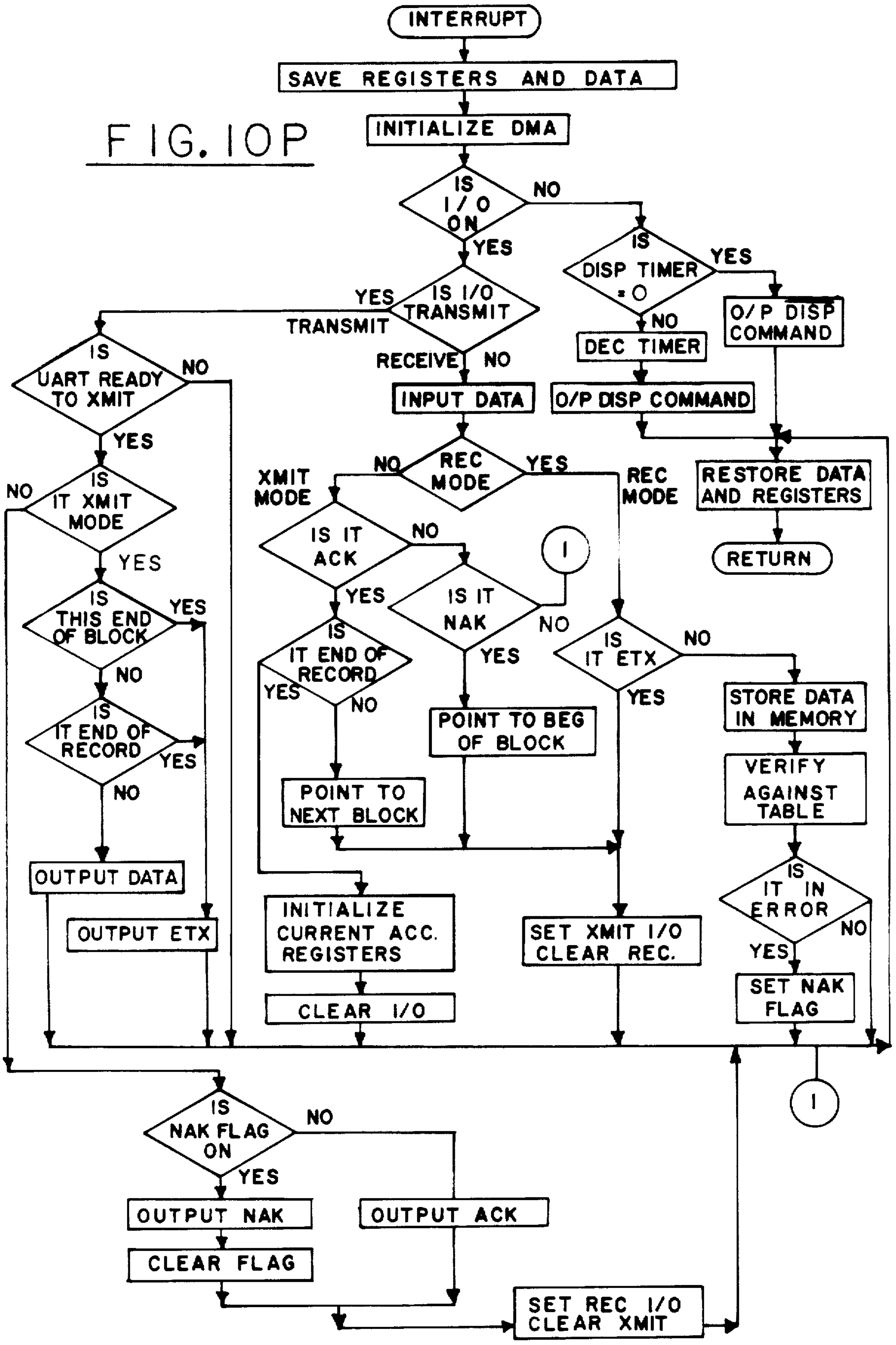
Figure 10Q:
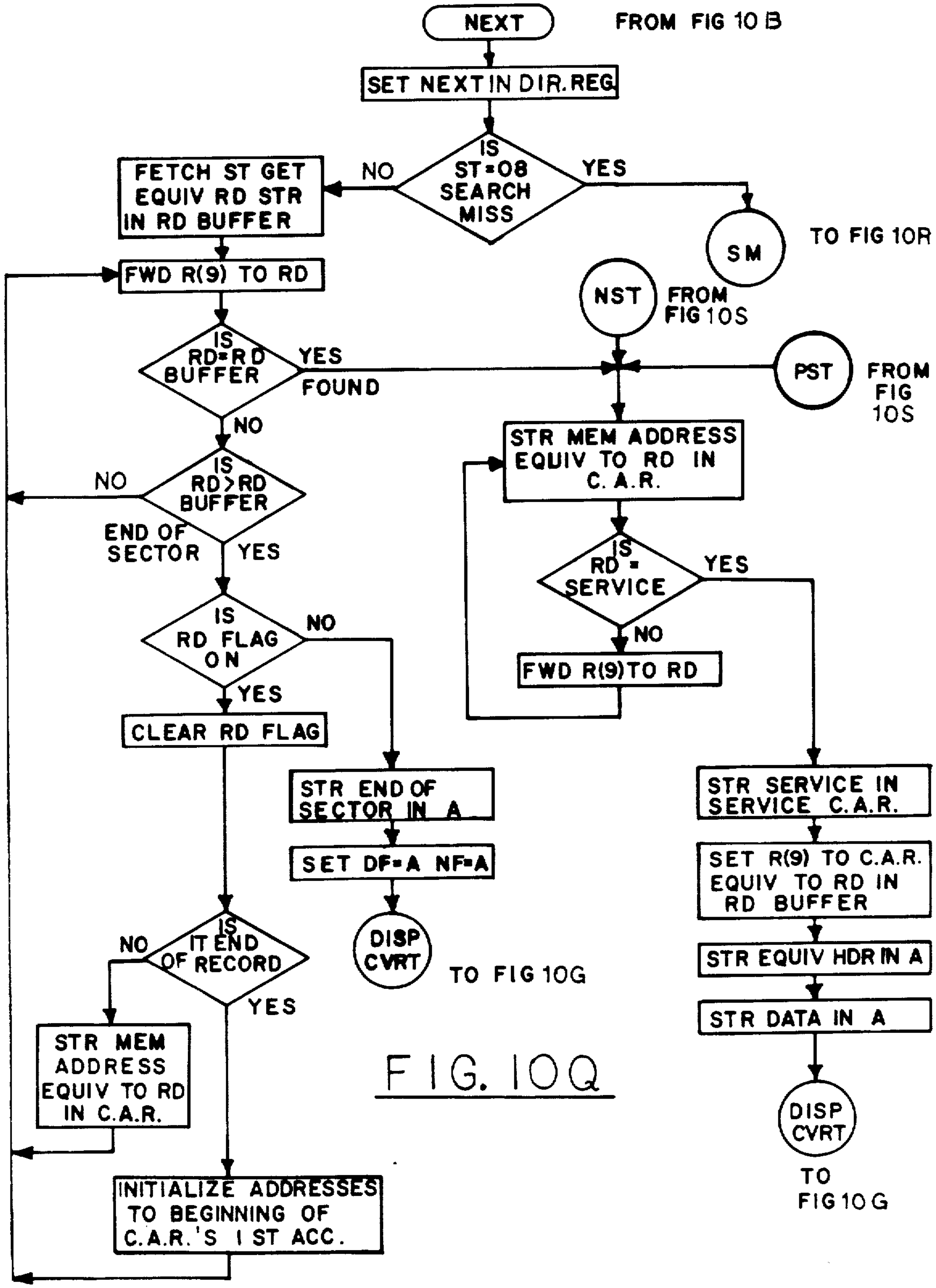
Figure 10R:
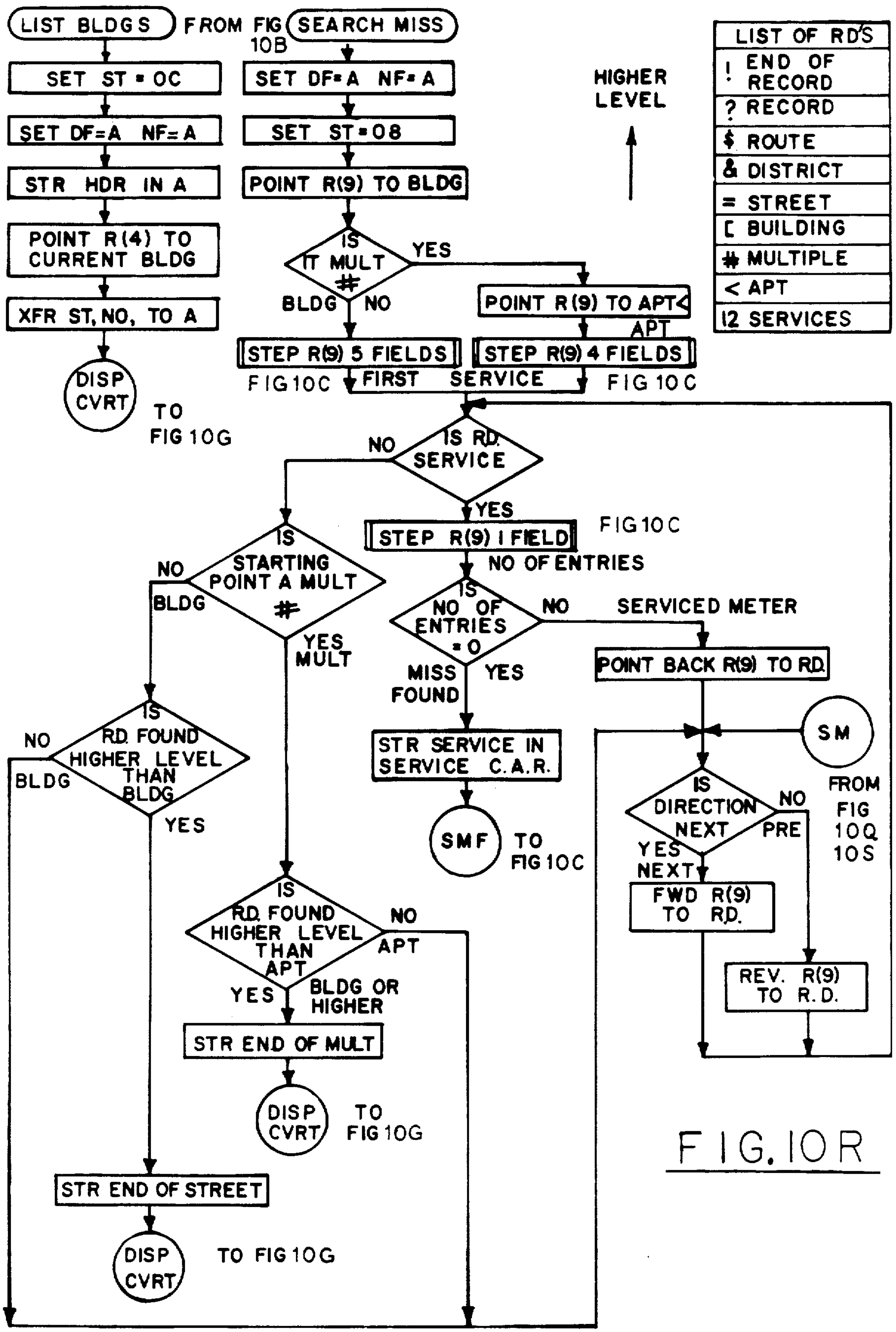
Figure 10S:
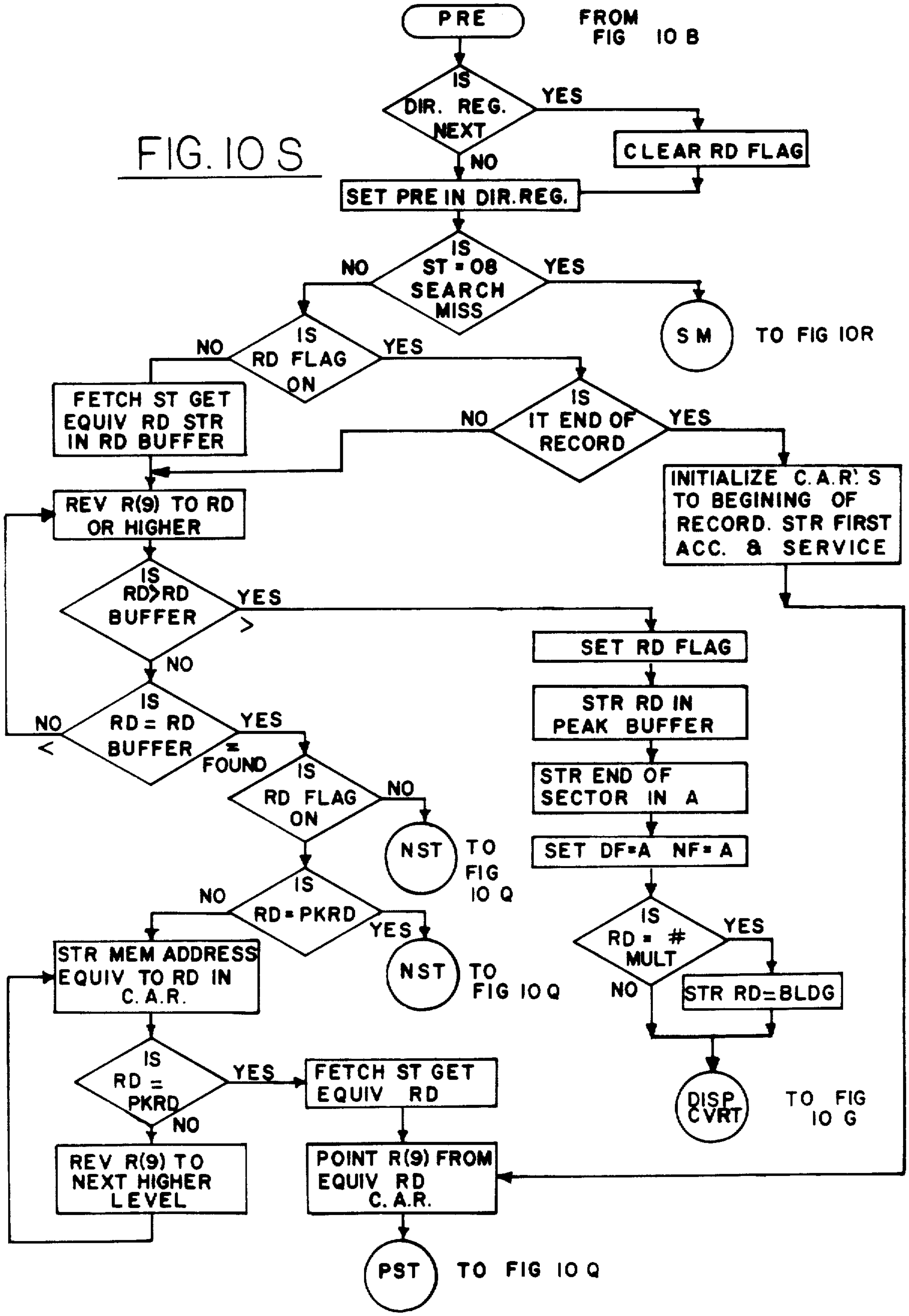
Figure 10T:
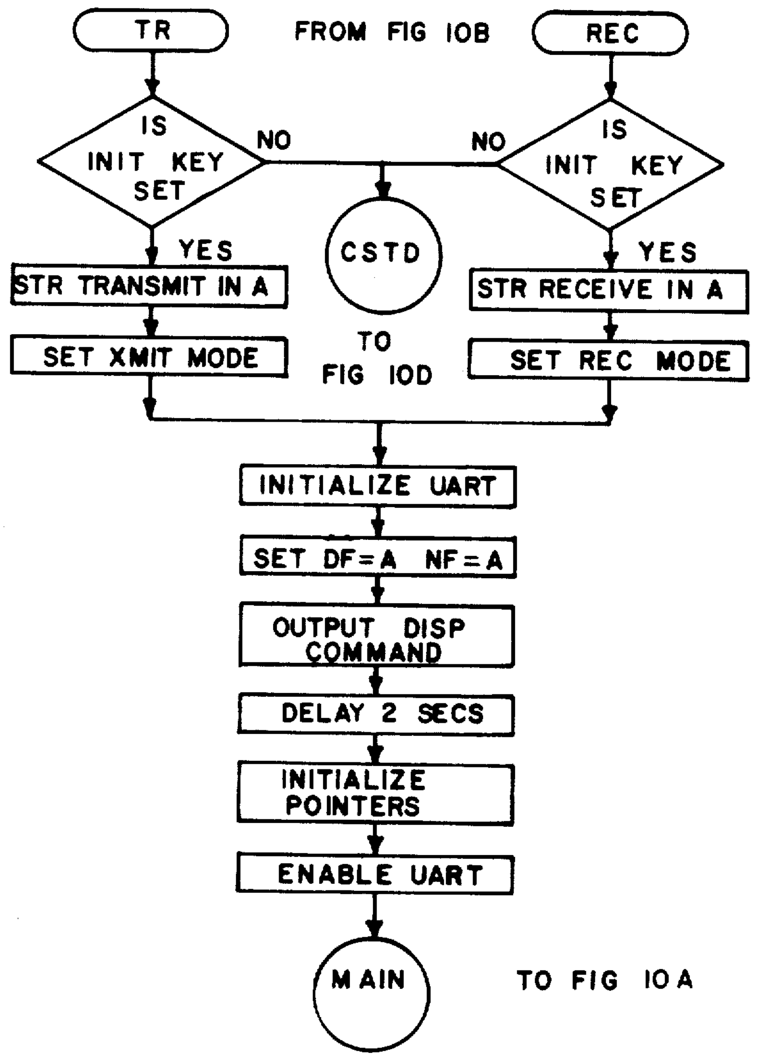
Figure 10U:
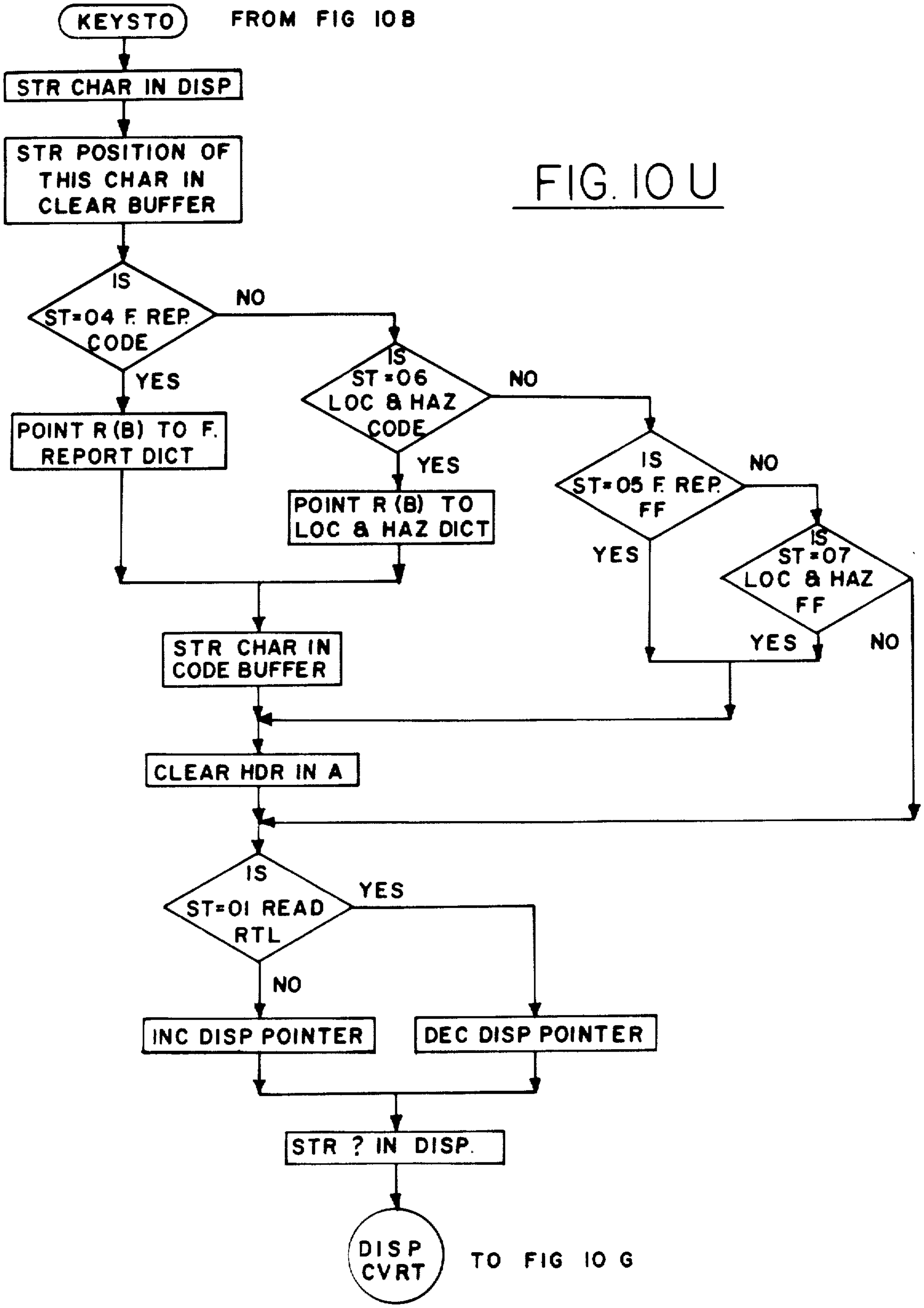

FIGS. 10A–10U are the program flow charts.

DETAILED DESCRIPTION OF THE INVENTION

It is helpful at first to describe the preferred organization of the data, then follow up with the preferred method of retrieving selected data from the mass of information provided in the record.

Memory which is finite and costly in hand held devices, needs to be optimally utilized in order to pack maximum accounts for a given capacity. Consequently, the organization of data is of import. Different data organizations are possible and which can be implemented in the data collection device disclosed and the preferred disclosure should not be considered as restrictive, but one example of many forms.

Conceptually, the preferred record consists of unique data and associated data and the objective is to extract common denominators at different levels and build an organization whereby the highest common denominator is at the top of the pyramid then progressing downward into multiple levels, each having groups with common denominators and finally the residue, is the unique at the bottom levels. Implementation of this preferred commonality principle provides substantial memory savings. The next step is the development of the preferred method of retrieving associated data at the different levels which is done by selecting at each level which branch to follow. Movement is bidirectional, specifically, downward movement leads to selection of an account and its discreet data and upward movement leads to compilation of associated data of each account.

The preferred procedure described, provides an efficient means for search and retrieval and is now discussed in further detail.

A record as received by the data collection device from the computer consists of one or more Routes, TABLE 2. Each Route is divided into Districts. Each District is divided into Streets. Each Street has buildings, single account or multiple account buildings. Each account has a variable number of services and to each service or meter, specific data is listed. The meter reader has options to modify some of the specific data. All the above data may be displayed in the alphanumeric display. The record as modified is retransmitted back to the computer, at the end of the collection period.

Refer now to FIG. 1 which illustrates in block diagran form, the preferred embodiment of the portable data collection device.

A microprocessor (CPU 127) provides addressing and control to all circuits in its periphery. The program is resident in the Read only Memory (ROM) 138 and the record from the computer is stored in RAM memory 137. A portion of the RAM memory 137 is allocated to working memory for execution of the program. A system clock 131 provides basic timing to the microprocessor. The microprocessor receives a control signal and data from the keyboard 101 as any key is actuated, and outputs data to the display 118 as the requirements arise. A UART universal asynchronous receiver transmitter 154 forms the input output interface and provides means under CPU 127 control to transmit or receive data via the RS232C connector to the outside world.

The source of energy is a battery pack 160 and includes regulating circuits and sensing circuits of battery depletion.

Refer now to FIG. 2 CPU 127 which is an RCA 1802 8 bit microprocessor, has two sets of bus lines which are floating until activated, by any of the different source circuits connected to the bus. One bus is the address bus, A-bus consisting of 8 lines indicated A0 to A7. The A lines represent a binary coded address with A0 representing least value. The second bus is the Data bus, D-bus, also consists of 8 lines which are identified as D0 to D7. D0 is the least significant bit. CPU 127 can input or output data via the D lines at suitable times in its cycle.

CUP 127 normally sequences between two states. In the first state S0, the next program instruction is fetched from the ROM 138, and is stored in the CPU 127. In the next state S1, the program is executed and the RAM's 137 are addressed to read or write data as the instruction requires. The crystal 131 in conjunction with circuits in the CPU 127 provide basic clock timing pulse CLOCK.

Refer now to FIG. 3 which illustrates the timing of the CPU cycles. CLOCK is divided by eight in CPU 127 to provide the standard cycle period. Also, CPU 127 generates two timing pulses T1 and T2 for use in the system logic. $\overline{MRD}$ is a memory read pulse active low and $\overline{MWR}$ ia a memory write pulse also active low. When $\overline{MRD}$ and $\overline{MWR}$ are both high it is a non-memory operation.

N0, N1, N2 are three binary coded command lines which are activated in input or output data from external circuits into CPU 127. Refer now to FIG. 2 CPU 127 outputs two waveforms ST1 and ST2 to identify the states it is in. ST1 and ST2 consist of a binary number which decodes into four states. When both are low we have the S0 state, ST1 high alone is S1 state, ST2 high alone is S2 state and both high is S3 state.

Decoder 136 is used to decode the S2 and S3 states for use by DMA and INT circuits respectively, later described.

Thus CPU 127 is at any time in one of four states and the basic CPU waveform conditions are shown in FIG. 3.

Under normal operating conditions, CPU 127 cycles consist of, Fetch the next instruction S0, then execute it S1, then S0, S1 and so on. At the end of each execution cycle S1, the CPU 127 tests if any external DMA or Interrupt request has appeared on lines $\overline{DMA}$ or $\overline{INT}$ active low. If so, it changes its state into S2 or S3 respectively, with DMA having higher priority.

In a DMA state S2 (direct memory access), program operations are suspended for one cycle, and memory is addressed by a separate register and the memory content appears on the D-bus. At the end of the cycle, again a test is made for DMA or INT. If $\overline{DMA}$ is still low, a second S2 cycle is initiated, otherwise it reverts to the S0 state, to continue with the original program. DMA thus steals one cycle from the current program to read memory. DMA cycles are used to output data from memory to the display. If on the other hand an interrupt is requested, as evidenced by $\overline{INT}$ going low, then an S3 cycle is initiated, causing all activity on the current program being suspended and the CPU executes an interrupt routine until completed. At that point, the original program continues where it left off.

Interrupts are used to respond to I/O requests to input or output data from the UART 154 and also, to initiate a display operation by the keyboard 101. In the exemplary embodiment CPU 127 contains sixteen, 16 bit registers which can be used for addressing memory or to store data. These registers are designated in the program flow diagrams as R(0) to R(F) using hex notation. Any register can be used as a program counter except for the first three which are exclusively used. The first one R(0) is used to address memory automatically during DMA cycles. The other two R(1) and R(2) are interrupt registers of which R(1) is the program counter for the interrupt routines.

The eight A-bus lines supply 16 bit memory addresses in two successive steps. The higher order of addresses A8 to A15 appears prior to T1 and the lower order of addresses A0 to A7 appears after T1. Hence it is necessary to strobe and latch the higher order in order to obtain the full sixteen lines after T1. Four bit Register 135 latches A0 to A3 when clocked by T1 to obtain A8–A11. In addition, three-bit Latch and Decoders 128 and 130 both, latch A4 to A6 when clocked by T1. The decoders decode the three latches into one of eight combinations representing the number in the latches. The selected output however appears active low only when the decoder is enabled. A7 address line is used as the enable control. When A7 is low, decoder 128 only outputs and when A7 is high, inverter 129 causes decoder 130 to output. Hence only 128 or 130 are active at any given time. The outputs of the decoder 128 and 130 are used as chip select controls for the memories and are designated waveforms $\overline{CS0}$ to $\overline{CS15}$. Hence just after T1 all address lines A0 to A15 become valid. Refer now to FIG. 4 which is a schematic illustration of the ROM and RAM memories.

In the exemplary embodiment, each of these memories 137, 138 have a capacity of 4096 locations and are addressed with lines A0 to A11 derived as aforesaid after T1, from CPU 127 A-bus, A0 to A7 and the output of register 135 A8 to A11. The higher order addresses A12 to A15 of the total sixteen are used to decode to chip select waveforms, so that one and only one memory is selected to output or input data. The data outputs of each memory, consists of eight lines and are connected to the D-bus leading back to CPU 127. The ROM's 138 can only output data and therefore no additional controls are used. The RAM's 137 can either input (write) or output (read) data and waveform $\overline{MWR}$ derived fron CPU 127, if high, causes the selected memory to read to the D-Bus and if low, to write from the D-bus to the selected memory location. Refer back to FIG. 2 Since the memory must be timed to operate at a specific location either for read or write in the CPU cycle, the outputs of the decoders 128 and 130 ie. $\overline{CS0}$ to $\overline{CS15}$ are also controlled by waveform $\overline{R+W}$, which is a composite read or write waveform generated by AND gate 134, which functions as an OR gate for the active low $\overline{MWR}$ and $\overline{MRD}$ from CPU 127. This ensures that the memory is selected to operate at the correct time in the CPU cycle.

In the exemplary embodiments two 4096×8 ROM's and 15, 4096×8 RAM's are shown, both RAM and ROM may be of any desired size or quantity.

Connected to the Data D-bus is also register 139 in which data on D0 and D1 can be stored at time T2 when the register is selected with an active low. Selection is made by an output instruction from CPU 127 resulting in command lines N0, N1, N2 to go all high and $\overline{MRD}$ low. Inverter $\overline{MRD}$ and NAND gate 140 output goes low if the condition is satisfied. Register 139 stores three conditions. If D0 is high at the time of selection and clock T2, DISP goes high and $\overline{DWP}$ goes low, DISP going high initiates the display operation as is discussed later. Similarly, if D1 is high at the time of selection and clock T2, I/O goes high and I/O goes low. I/O going high enables any requests from the UART 154 in NAND 143 output goes low if I/O is high and I/O INT is high indicating an acceptable UART request. AND 145 forms an active low OR function and NAND 147 is similarly an OR function with active high. This condition enables, at time T2, flip-flop INT to set and $\overline{INT}$ to go low. $\overline{INT}$ is connected to CPU 127. $\overline{INT}$ going low causes an interrupt cycle S3 to be initiated in the CPU 127 as discussed previously. During S3 cycle, lines ST1 and ST2 of CPU 127 go high causing waveform S3 from decoder 136 to go high, which resets the interrupt flip-flop INT 148 via NOR gate 149. I/O INT from UART 154 goes low only after the UART is addressed which takes place sometime downstream in the execution of the interrupt routine. Hence at the next T2 clock $\overline{INT}$ will go low again, but while in the interrupt routine other interrupts are inhibited and prior to its conclusion the routine pulses Q which is normally low, to reset the INT flip-flop via NOR gate 149.

Inverter 152 and its associated resistor, capacitor circuit provide a reset pulse CLEAR. When power is first switched on $\overline{CLEAR}$ or CLEAR are connected to the various circuits as required, to force them into an initial reset condition.

Counter 132 derives its input from CLOCK and counts down to provide TS, which is a frequency of one pulse per second and TD, which has a frequency of 2048 pulses per second. TS is connected to CPU 127 to be sensed under program control and causes the time of day to be incremented. TD is used to sequence the display and is discussed next.

When the program is ready to initiate a display, it outputs a command to register 139 setting DISP. DISP, which is connected to flip-flop 151 is sampled at every TD pulse, and if true, sets DMA flip-flop 151 causing $\overline{DMA}$ to go low and since it is connected to the $\overline{DMA}$ input of CPU 127 causes a DMA cycle to be initiated. The DMA cycle is required to extend over two cycles of the CPU, to provide two data outputs from memory, Flip-flop 150 provides this function causing S2 waveform to be delayed till after T2, to reset the DMA flip-flop 151. By then, $\overline{DMA}$ is sampled a second time by CPU 127 which results in two consecutive DMA cycles. During a DMA cycle register R(0) addresses memory and is incremented at the end of the cycle.

At the conclusion of the DMA pair of cycles, R(0) is incremented twice. The least significant address bit A0 changes state from zero to one and back to zero.

Refer now to FIG. 5A which is a schematic illustration of the display. AND gate 122 goes high during each S2 cycle at time T2. Since A0 is low in the first DMA cycle then high in the next DMA cycle, two single pulse clocks are generated UCLK from AND gate 123 and LCLK from AND gate 124 as a result of inverter 121. The two clocks are used to store the D-bus which contains data read from memory, into the respective registers 114 and 115, one in each cycle. Refer to FIG. 5B which illustrates a single character display. Fourteen LED's A–N are physically positioned as shown. By selecting a set of LED's to turn on and others off, characters can be displayed. A fifteenth LED D.P. displays the decimal point. Refer now to FIG. 5A. Any character to be displayed is first converted from ASCII into its 14 segment representation by the program. The 15 bit number is the output from memory as two 8 bit words as described previously.

The pattern of one-bits stored in the registers 114 and 115 switch on drive circuits 116 and 117, the remainder, which are zero, switch off their respective drive circuits.

In this exemplary embodiment a 12 character display is shown, it may be of any desired size. Each character is shown in the schematic as a vertical column of 15 LED's 118. The LED's of the other displays are connected in similar manner.

The LED's 118 of each character are commoned and connected to decoder and drive circuit 125. A four bit binary counter modulo 12 steps to the next count with each UCLK clock pulse, provided the reset pulse $\overline{RS}$ is high. As, an example LED F in 118 is turned on when a one bit is stored in the D5 line of the register 114 which turns on the respective drive circuit 116. The drive circuit 116 provides a path for the + voltage via the series resistor to the anode of LED F. If the counter 126 is set to all zero, decoder and drive circuit 125 will turn line 1 active low, providing a ground path to the common line leading to the cathode of LED F. Decoder 125 turns on one line at a time, namely one character at a time, and therefore twelve steps are required to energize all twelve characters. As each character is energized, the others turn off, but due to the retentivity of the eye and the repetition rate, the display will appear continuous.

Initially when the display is off, DISP is low, which resets the registers 114 and 115 and sets latch 119 causing $\overline{RS}$ to go low, and reset the counter 126 to first position. When DISP is set high by the program via register 139, the reset condition on registers 114 and 115 is removed allowing data to be stored during the DMA cycles. Pulse UCLK attempts to increment the counter 126 but is prevented by $\overline{RS}$, Flip-flop RS 119 is cleared on the second DMA cycle by LCLK via inverter 120. At the next DMA pair the counter 126 increments in normal fashion.

Refer now to FIG. 2. When the twelve characters have been displayed, it is necessary to return CPU 126 register R(0), to address memory at the location of the first character. This is achieved with NAND gate 146 which detects the 12th character memory location during S2 and via NAND gate 147, which functions as one OR gate, sets the interrupt flip-flop INT 148. The interrupt routine initializes register R(0) back to first location and the display recycles. The interrupt routine stops the display at any time by outputting DISP low on register 139.

If a request to display is made via the keyboard key 133 FIG. 7, inverter 111 output DSW goes high, which causes an interrupt to be initiated if the conditions that the display is off, $\overline{DISP}$ high, and the UART is not operating, I/O is high, is satisfied in NAND gate 144, FIG. 2.

Refer now to FIG. 7 which is a schematic illustration of the keyboard. In the exemplary embodiment the keyboard consists of thirtyeight control and data keys 101, three shift keys 106, and one display key 113. The thirtyeight control and data keys 101, are connected in the form of two matrices as shown. The keyboard encoder 100, pulses each of the 5 lines in succession until a signal is detected on one of the four X lines as a result of a key closure. Scanning stops and the address of the key actuated is derived from the X and Y positions and stored in the C register as a binary coded number, C0 to C4. To distinguish between the matrices, isolation diodes 102 and NAND gate 103 provide externally an additional bit to the C address as C5, via latch 108.

DA is the data available signal connected to CPU 127 as a sense signal. Shift keys U, M and L 106, are encoded as a 6-bit binary number and latched as bits C6 and C7 in latch 108.

The controls of the C register C0 to C7, are transferred into the D-bus via buffer 105 upon receipt of an input command $\overline{KEN}$ from CPU 127 and then cleared. $\overline{KEN}$ is generated by NAND gate 142 in FIG. 2 from CPU 127, N command lines and $\overline{MRD}$.

DSF Flip-flop 112 toggles whenever the keyboard request to display key DISP 113 is released. DSF is connected as a sense line to CPU 127 to cause a display to be initiated.

Refer now to FIG. 6 which is a schematic illustration of the interface. UART 154 which is program controlled via the N command lines and $\overline{MRD}$, can be set to Receive or Transmit data.

When in receive mode, each incomming character in bit serial form via the RS232C connector 159 is fed into the UART 154 via buffer 155 and converted into an 8 bit parallel word.

An interrupt, I/O INT, is generated which causes in turn for the word to be read via the D bus into CPU 127 and the RAM memory 137 under program control.

Similarly, when on Transmit mode, and the UART 154 is empty, an interrupt is generated, I/O INT causing in turn for the next character to be read from RAM 137 under program control and stored via the D-bus into the UART 154 transmit register. The UART then converts the 8 bit parallel word into serial form, RS232C compatible, and is fed out into the RS232C connector via buffer 157. Waveforms $\overline{CTS}$ (clear to send) and $\overline{RTS}$ (request to send) are the standard waveforms used for modem or external device control of transfer of data.

$\overline{CTS}$ and $\overline{RTS}$ are buffered via 156 and 158 respectively. The speed of transmission is defined by the TCLK and RCLK clocks in UART 154. In this exemplary embodiment, 1200 baud asynchronous is used, derived from the clock frequency of 19.2 KHZ generated by counter 153 or received from an external source. The speed may be any standard rate desired and the form can be synchronous or asynchronous.

Refer now to FIG. 8 which is a schematic illustration of the power supply. A rechargeable battery pack 160 provides the source of energy. The battery voltage is fed to regulator 167 via switch 164, to provide the + voltage to the circuits.

One of the features of this invention is a method and circuit to replace the existing battery when power is on, without loss of voltage and therefore, data, since the memory could be volatile.

Only one battery pack 161 is used and could be connected to connector 160 or 170. Assume battery A is connected. Switch 164 which consists of a 2 pole switch, is switched to position A and the two indicators 163 and 168 are off which is the normal operating state. In this position, Switch 164 shorts diode 169 thereby providing full voltage to the regulator 167. To replace battery A, battery B is first connected at 170 which now provides all or part of the power to the regulator 167 via diode 162 depending on the state of charge of battery A.

Indicator A 168 turns ON, indicating the A is the power source. Switch 164 over to B, diode 162 is now shorted, indicator A 168 turns off and indicator B163 turns ON indicating that B is the power source. Disconnect battery A and both indicators turn off.

Comparator 165 senses the battery voltage and compares it against an internal reference voltage to provide a low power indication by switching on LED 166. Potentiometer 171 provides a low power indication at any desired time prior to total loss of power.

Refer now to FIG. 9 where there is illustrated the front view of the keyboard.

In the preferred physical embodiment, the keyboard is covered with a mylar sheet for weatherproofing and on which the keys are outlined and identified into four colored sections (Red, Blue, Black and multicolored). The top Red section is labelled ENTER and contains preferably six keys. These keys are used by the Meter Reader to store new data pertaining to a selected account.

The middle, Blue, section is labelled DISPLAY, and contains preferably eight keys. These keys provide display, upon request, of data pertaining to a selected account.

The Black keys are used for control functions, such as selection of various accounts or for storing special functions.

The multicolored keys, on the lower part of the keyboard, form an alphanumeric set for data entry.

In the following text, the preferred embodiment of the invention is disclosed and henceforth described in exemplary form for utility meter reading. The following text describes a specific utility meter reading application, and to ease disclosure, certain fields in the data structure and certain device features where allocated a specific function, size, or capacity and should not be read as a constrain on the concept. The design is expandable and can take many forms. The system is adaptable to many other applications whereby an operator is assigned a Route to carry out multiple transactions.

The following text describes in detail system operation.

Refer now to FIG. 1 which is the device system block diagram. RAM memory 137, for the purpose of the operating program, is divided into multiple sections. One section is used to store the Route Record as it is downloaded from the User's computer. Another section is allocated to the New Accounts file. Another section termed the Special record contains the new Location and Hazards files and the new Field Reports files. Another section is a 48 character Display Buffer into which, the data is transferred for display. This buffer consists of four, twelve character registers identified as A, B, C and D in the program Flow Diagrams. Another section consists of Operating Registers described as follows: A Time of Day Register which is incremented by the program once per second in the form of Hours, Minutes and Seconds. At Sequence Register in which the last sequence number is stored and is incremented whenever a new meter reading is stored by the meter reader. A Direction Register in which is stored the last forward or reverse key entry for program reference when scanning the memory for next accounts. A New Accounts Register which stores the address of the last field stored in the New Accounts file. A Special Record Register in which is stored the relative address of the last file filled in the Special Record. An Account Identifying Register in which is stored account identifying data entered by the meter reader for the purpose of searching and locating an account in the route record. Current Account Registers in which are stored the addresses of all the files associated with the account currently being accessed such as the Route file, District file, Street file, Building file, Apartment file and Service file. These Current Account Registers are updated by the program as other accounts or services are accessed in response to meter reader requests.

ROM 138, FIG. 1, is also divided into sections. One section consists of the User Field Format Tables, TABLES 15A thru K. Another section contains the Pointer Table, TABLE 15L, to correlate each Reference Designator Field Format Code with its associated Field Format Table. Another section contains the Service Identification Table, TABLE 15M, to determine the character to be displayed in order to identify the service. Another section is allocated to the various Dictionaries used to translate coded messages into text form. Four dictionaries pertain to Location & Hazards messages and three dictionaries pertain to Field Reports.

Another section contains a Keyboard Table provided to decode the key code received from the keyboard circuits 100 FIG. 7 and point to the associated routines for execution of the function requested.

ROM 138 is used to store the system programs FIG's. 10A–U. The procedure adopted by the program to locate a given field in a file is first discussed and then the method is expanded to describe how specific files are located in the record.

As an example we want to access the n-th field of the current service file. The current account service register in RAM memory 137 is first addressed and the contents are transfered to a register in the CPU 127 which is then used to address RAM memory 137 i.e. the current service file at its first character, which is its Reference Designator field format code.

The Reference Designator Field Format Code prefixing that service file is read and a constant is added to it to form the absolute memory address of the associated entry in the POINTER TABLE, TABLE 15L. The contents of the Pointer Table, is the address of the first entry in the FIELD FORMAT TABLE, TABLES 15A–K associated with the Reference Designator of the current service file. Since each entry of the Field Format Table represents a field in the associated file, and the contents of the table are the number of characters in that field, by adding the contents of each entry to the RAM memory address register pointing at the current service file it will cause the register to step field by field until the n th field is accessed.

If on the other hand the objective is to located another service file, then stepping field by field, is allowed to continue until the End of Table code is read. At this point the RAM memory address register is pointing at the Reference Designator field format code of the next adjacent file. This Reference Designator code is now read and compared with a list of all Reference Designator codes used to determine if it is a service file. If so, the contents of the RAM memory address register are transferred to the current account service register in RAM memory 137, which now points at the new service file. If it is a different type file, the corresponding current account register is addressed and the contents of the RAM memory address register are transferred. The program then accesses the next file using the Tables as described above to step through the fields of the current file. Note that whenever a higher level file is crossed all lower level files are located along the data stream so that the current account register at all times, points to an account and the first service in that account.

When the device is first switched on, the POWER ON routine FIG. 10D is automatically addressed, leading to a self check of the device operation, then a test of the RAM memory 137. If all the tests are successful, the RAM memory is cleared, and all registers and pointers are initialized. When the operator connects the cable to the user data processor and actuates REC key 25, FIG. 9 a receive request code is transmitted by the device requesting a Route Record to be downloaded. Upon conclusion of the resultant data transfer, the program loads the Current Account Registers with the addresses of all the files related to the first account in the record and displays a request for a Route heading. At this point, the device is positioned at the first service of the first building, in the first street, district and route of the record. If ACC ADDRESS key 17 is pressed, the display will show in four lines the street number, the street name, the apartment number if a multiple building and identifies all the services associated with that first account i.e. EGW etc. (electric, gas, water meters) listed in the same sequence as they are positioned in that account service file. To determine where the first meter (electric) is located, the meter reader presses LOC & HAZ key 38 and the resultant display will identify the location of the meter and any hazards or instructions to watch for. Once he finds the meter, he may want to identify the meter by pressing METER NO CONST Key 35 and the display will show the meter type in this example E followed by the meter serial number and the meter constant. If he now wants to read and store the meter reading, he presses METER READ key 31 in the Enter section of the keyboard. The display will show ER0 ?, (electric read, zero entries made, and the question mark is the cursor requesting the first character and identifying the position on the display where the first character will be stored.

Some meter readers prefer to read the meter dials from least significant to most significant, while others read the meter dials the other way around. To allow for these preferences, when the METER READ key 31 is pressed a second time, the cursor is moved to the opposite end of the meter reading field and the entry sequence is reversed. The meter reader then keys-in the meter reading character by character which is displayed with the cursor moved to the left or right as selected.

Upon conclusion, EX key 51 is pressed, which causes the program to store the reading into the service file, and a comparison is made of the reading with the High and Low limits included in that file. It then increments the Number of Entries in that file, and displays, if within limits, E READ OK, or if outside limits, the display flashes E RPT READ (electric, repeat reading). At this point the meter reader is expected to read the meter again and reenter the reading. Pressing METER READ key 31 will now display ER1 ?, electric read, one reading stored) or if pressed again ER1?, and the procedure for entry is repeated. With reentry, the number of entries field is incremented by one, starting from zero, when no readings are present, and the number is displayed with the reading. If he elects to check the previous entry prior to reentry, pressing METER READ key 36 in the display section of the keyboard will produce the display ER1 XXXXX, (electric, one reading stored, and the meter reading). Note that the number of entries concept provides positive proof that a new reading was stored.

At this point the meter reader will want to proceed to the next service of the current account. Two methods are provided. One is to press SERVICE key 12 which causes the device to step to the next service in the sequence for that account, and the display will show G (gas in this example). From hereon, all keyboard transactions will pertain to this service until a new service or account is requested. The alternate method is to press SEARCH MISS key 34. The objective of SEARCH MISS is to search and locate accounts with unread meters starting with the current accessed account. In this example, the second service will be accessed since the first service has been read and the device will be positioned at this second service.

The advantage to using SEARCH MISS key 34, is that meters will not be missed, since the program checks all services in the current account for missed readings prior to stepping to the next account. In practice, meters in a building are read as they appear along the meter readers path and not necessarily according to the sequence the services appear on his display.

Hence, SEARCH MISS eliminates potential missed meters and since transfer to the first service of the next account is automatic along his direction of motion, it saves one more key actuation to step to the next account or service.

When the meter reader presses NEXT ACC key 37 or PRE ACC key 40 or SEARCH MISS key 34 to step to the next account and the program finds a new street file in the route record sequence, it retains the device positioned at the last account and displays END OF STREET. The meter reader now has the option of continuing to the next street with a NEXT or PRE or SEARCH MISS actuation, or while he is still in that street, to check for missed readings. In the latter case, he first reverses his direction with either NEXT key 37, or PRE key 40 then presses SEARCH MISS key 34. The program searches all accounts and their services starting at the last account i.e. the last building in that street, back to the beginning of the street. If no missed readings are found, it will display END OF STREET, Reversing again the direction with the NEXT or PRE key and pressing SEARCH MISS will position the device at the first service of the first account in the next street and the display will indicate the street name and number and the type of service in that account. If the reverse search finds a missed reading, the search will stop, the current account registers are updated with the addresses of the missed account and the display will indicate the street number of the account and will position the device at the service missed. If on the other hand, the program detects two or more boundaries such as a district file then a street file, it will display END OF STREET then END OF DISTRICT prior to crossing over to the first street in the next region. Similarly, when meter readings are taken in a multiple account building, after the last unit or apartment is accessed an END OF MULT is displayed. Again a SEARCH MISS function can be initiated in the reverse direction as described previously to locate missed meters, and the search stops either at a missed meter service or with a display of END OF MULT.

Sometimes, as a result of weather conditions, obstacles or even personal reasons a meter reader might find it necessary or convenient to interrupt his prescribed route and continue elsewhere or start at another location. To determine a starting point, he can request listings to be displayed of the Routes, Districts, Streets and Buildings by means of the LIST key 15 and Shift Keys (U)upper 20, M(middle) 21 and L(lower) 22. Pressing L key 22 then LIST key 15, will provide him with a display of the current Route and its identification. NEXT key 37 causes the program to search for another Route file in the forward direction and display it, or if none to display END OR RECORD.

Similarly, if PRE key 40 is pressed, the program will search for a route file in a reverse direction and display it, and again if none is found, to display END OF RECORD. As each Route is displayed in response to each NEXT key 37 or PRE key 40 actuation, the program also updates the current account registers to permit immediate access by the meter reader to an account. The procedure is as follows. The program stores the contents of the RAM address register pointing at the route file found in the current account route register. It then searches in a forward direction for the next immediate District file and stores its address in the current account district register and continues likewise searching and storing the addresses of the first street in that district, then the first building in that street, if the building is a multiple, the first apartment in that building, then the first service of the account. Having selected a route, the meter reader can now select a district by pressing M key 21, then LIST key 15. The display will read the current District and its identification. If he choses this District, he can proceed with a street selection.

Otherwise, pressing NEXT key 37, will display the next district file in the selected route. If a Route file or an End of Record file is found, the search stops, an END OF ROUTE is displayed, and the current account registers retain their previous addresses. Pressing PRE key 40, starts the search in a reverse order and the last district displayed will be again displayed. Having selected a District, the meter reader preceeds with a selection of a street in that district. Pressing U key 20 then LIST key 15 causes a display of the current street. Next key 37 will provide him with a succession of street displays until a District, Route or End or Record file is found in which case the display will read END OF DISTRICT. With each street display, the program updates the street, building, apartment and service current account registers. Similarly, a building can be located by pressing LIST key 15. The display will show the current building number and actuating NEXT key 37, advances the display to the next building until a higher level file is found and an END OF STREET is displayed.

With each building display, the program updates the building, apartment and service current account registers.

An alternate and easier method to locate a building in a street is available using the LOCATE key 14. A meter reader can walk up to a building and request the device to find the building in the record. Pressing LOCATE key 14, the device will prompt him for a building number. He then keys-in the building number and presses EX key 51. The program scans all building files in that street and compares each with the requested number. When found, the building, apartment and service current account registers are updated and the display reads FOUND ST# XXXXX. If not found, the displays reads NOT FOUND ST# XXXXX.

The meter reader can then verify that the device is positioned in that street, by pressing ACC ADDRESS key 17. The display will indicate the street number and name of the current account.

A meter reader can locate an apartment in a multiple building by pressing U key 20 then LOCATE key 14. The device will prompt him for an apartment number. When the desired apartment number is keyed-in and the EX key 51 is pressed, the program scans all apartment files in that building and compares their number to the entry and when found, the apartment and service current account registers are updated and FOUND APT# XXXX is displayed. If not found, the current account registers are not updated and NOT FOUND APT# XXXX is displayed.

In the course of his walk, a meter reader might come across a new account such as a building not included in his route record or a new service which has been added to an existing account. He can store this data and the meter reading in the New Accounts File thus providing the Utility not only a meter reading but also the preferred position in the route record sequence for future inclusion in that record. To store a new account, he presses NEW ACC key 13 and the device will prompt him for data. He then keys-in the meter number and the meter reading and other relevant data and presses EX key 51. The program reads the contents of the New Accounts register located in RAM memory 137, which consists of the address of the last field entry in the New Accounts file, increments the address to point to the next empty field, transfers the data entered by the meter reader from the display buffer and includes with this data the next sequence number from the Sequence Register or the time of day from the Time Of Day Register if the latter is used to determine the sequence of meter reading, then updates the Sequence register if used, the New Accounts register with this last field address, and clears the display.

At times, the meter reader will find a meter relocated, a new hazard, or he might want to record special instructions by the subscriber. He stores a new Location & Hazard message with one of two methods, coded entry or free form text entry. At first, the method used for storing data in the Location & Hazards field in the Service files is outlined, then the methods used by the meter reader for transacting entries will be described. In order to conserve memory, Location & Hazard messages which can be long sentences, are compressed into four alphanumeric characters, each character representing a word, or a sentence. Four Location & Hazards Dictionaries (one for each character) are resident both in the user's Data Processor and in the device ROM memory 138. To illustrate by an example, assume that entry G in the first dictionary represents GARAGE, entry W in the second dictionary represents WINDOW, L in the third represents LOCK GATE, and D in the fourth represents VICIOUS DOG. The message to the meter reader: "Meter is next to garage window, lock gate and watch for vicious dog" is coded by the data processor or GWLD and stored in the four character Location & Hazard field in the service file. Since the same dictionaries are contained in the device memory, the device will decode the four characters and display "GARAGE WINDOW LOCK GATE VISCIOUS DOG".

Since each character position of the coded message can be any letter of the alphabet or a number, the number of sentence combinations is very large. In the event that a sentence cannot be coded or might have an ambiguous meaning, a full sentence can be transmitted (free form) by expanding the Location & Hazards field from four characters to 23 provided the identifier code \(ASCII code 5C) is placed in the first character position. Hence, when the LOC & HAZ key 38 is pressed, to display the Location & Hazards for the current service, the program addresses the Location & Hazards field in the current service file and examines the first character if \, namely free form.

If it is, the next 22 characters are transferred to the display. If not free form, then the first character is read, and converted to an address pointing to the entry in the first dictionary where the associated word or words are located, and these are transferred to the display. Then the next character is read and the associated data is transferred from the second dictionary to the display, and in similar manner the third and fourth characters are decoded from their respective dictionaries and displayed.

If a meter reader wants to modify a Location & Hazard field with a new message, he can use either method described. A preprinted list of the Dictionaries is available to him for coded entry. To enter a message in coded form, he presses LOC & HAZ key 32. The display prompts him that the entry is in coded form. He enters the four characters and presses EX key 51. As each character is keyed-in, the program translates the character code from the associated dictionary and displays the equivalent text for verification. When EX key 51 is pressed, the program accesses the Location & Hazards field in the current Service file, checks if the previous message is free form or coded. If coded, the new message is stored in the field in original code. If free form (text) then the displayed translated message is stored in that field. If on the other hand, the meter reader prefers to enter his message in free form, he presses U key 20 then LOC & HAZ key 32. The display prompts him that it is a free form entry and he keys-in the message and presses EX key 51. The program checks if the Location & Hazards field in the service file is in free form. If so, it transfers the data from the display buffer to that field. If not, the four characters in that field are replaced by an identifier code * in the first position, and the other three characters are the relative address of the file in the Special Record in which the message will be stored. This address is derived from the Special Record Register in RAM memory 137 and is incremented for future use. The data in the display buffer is then transferred to the next empty file in the Special Report.

To review, in response to a request for display of the Location & Hazards for the current service, the program accesses the Location & Hazards field examines if the first character is \ or *. If it is neither, the message is in coded form, and the four characters are translated and displayed. If it is a \the message is free form and the next 22 characters are transferred to the display. If it is a *, the next three characters are converted into the absolute address of the file in the Special Record wherein the message is located and the message is extracted from that file and displayed.

Field Reports are messages entered by the meter reader informing the utility that corrective action is required, such as meter maintenance, leaks, customer tampering and so on. The field report fields in each service file are normally blank until filled by the meter reader. Therefore a request to display a field report with key FIELD REP 39, will read FIELD REP NONE, when the field is empty. Field Reports are entered by the meter reader with one of two methods; coded or free form (text) In the coded method, three alphanumeric characters are used to code sentences. Three Field Report Dictionaries both in the Utility Data Processor and in the device ROM memory 138 provide the coding and translation of the messages. To ease the coding process by the meter reader, the dictionary entries and their associated codes are in most part mnemonic and a preprinted list is available to the meter reader. Alternatively, if he prefers, he can also enter the message in full text form without coding.

To enter a Field Report in coded form, he presses FIELD REP key 33. The display prompts him for data with FIELD REP CODED? As each character is keyed-in, the program translates the code by means of its respective dictionary and displays that entry in full text for verification.

When all characters are entered and EX key 51 is pressed, the program transfers the three character code in the Field Report field of the current Service file, and the display is cleared.

If the meter reader elects to enter the Field Report in text form, he presses U key 20 then FIELD REP key 33. The display prompts with FIELD REP TEXT? for data. Using the alphanumeric section of the keyboard and associated shift keys 20, 21, 22 he keys-in his report which is also displayed for verification then presses EX key 51. The program stores the field report being displayed in the next empty file in the Special Record. This address is derived from the contents of the Special Record register located in RAM memory 137 and this register is incremented. The program then stores the relative address of this file prefixed by the identifier code * in the field report field of the current service file, for later access to the report, and clears the display.

The field report previously stored can be displayed by pressing FIELD REP key 39. The program accesses the Field Report field in the current service file in the usual manner, then examines the first character if it is the identifier *. If it is, the next characters in that field are read and are converted into an absolute memory address to access the file in the Special Record containing the desired field report. The file contents are then transferred to the display buffer. If the first character in the Field Report field is not *, the report is in coded form and the program translates each character in turn with the associated Dictionary and transfers the text to the display buffer.

If a meter reader finds that a meter was changed by comparing the serial number of the meter with that in the record, he can modify the record with METER NO CONST key 30. The program prompts with M#?. He then keys-in the serial number and constant and presses EX key 51. The program accesses the meter number field in the current account service file, transfers the data into that field, and clears the display. Key METER NO CONST 35 is provided to display that field.

In some buildings a key is required to gain access to the meter room. The method to display the key number using KEY NO 18 or to enter a new key number using KEY NO 11 is identical to that described for meter number and constant.

A meter reader, at any time, can request a summary to determine his progress, or when the route is complete, can quickly check if all accounts have been serviced. Pressing SUM key 41, provides a display consisting of SUM the total number of accounts in the record, and the number of accounts serviced.

If the route is completed and there is a disparity between the two numbers, SEARCH MISS key 34, when activated will locate the missed accounts.

The data for the summary display is derived from the last field in the Route Heading file TABLE 4. This field consists of two sections. The first section contains the total number of accounts in the route and the second contains zeros when the record is received from the data processor.

Subsequently, whenever a meter reading is stored for any account, the program checks if all services in the account have meter readings. If so, and if the correct entry is not a repeat entry, the second section is incremented by one, thus providing an accumulated total of the number of accounts serviced.

Prior to starting the route, the meter reader or his supervisor enter a record heading in the Record Heading file TABLE 3 by means of HDG key 26. The entry consists of the date, the time of day and the meter reader name or code number and the program then automatically includes the device serial number. EX key 51 when pressed, causes the program to store this data in the Record Heading file and increments the number of heading entries field, by one. This record heading can be displayed by pressing ROUTE key 19.

The last field in the Record Heading file TABLE 3 is used to store a report on the route as a whole. For instance, the reason why the route was not completed. Pressing U key 20 then HDG REP key 26 permits a 24 character entry by the meter reader and EX key 51 causes the message to be stored in the Record Heading File.

L Key 22 then ROUTE key 19 provides a display of the report in the Record Heading file.

TIME key 25 displays the time of day and U key 20 then TIME key 25 provides for setting the time in hours, minutes and seconds in the Time of Day Register in RAM memory 137.

STAT ACC NO key 16 provides display of the status of the account, if open or closed, and the account number, derived from a field in the current account building file TABLES 7 and 9.

CLEAR key 29 erases the last character entered and retraces the cursor one step. U key 20 then CLEAR key 29 clears the display.

DISP key 23 with each actuation, provides a display of the next line of data from the display buffer register. Four lines are rotated in sequence.

Transmission of the record back to the computer is carried out by connecting the device to the data processor interface and pressing U key 20 then REC/TR key 25. The data transferred is the original complete record as received and to it are appended the New Accounts file and the Special Record.

Refer now to TABLES 16A, 16B, wherein are tabulated a glossary of the abbreviations used in the program flow charts FIGS. 10A-U and some general description of the flow format.

TABLE 1

REFERENCE DESIGNATOR FIELD FORMAT CODES

The symbols listed in the following tables are the reference designator field format codes allocated to the respective files.

| Symbols | ASCII Code | File |
|---|---|---|
| | HEADER FILES | |
| $ | 24 | Route |
| & | 26 | District |
| = | 3D | Street |
| [ | 5B | Building Single |
| # | 23 | Building Multiple |
| > | 3C | Apartment or Suite |
| | SERVICES FILES | |
| 12 types of service groups are available to specify the different services, such as gas, water, electric, demand etc., for each account. There is no restriction as to which and how many are used. | | |
| " | 22 | Service 1 |
| ' | 27 | Service 2 |
| ( | 28 | Service 3 |
| ) | 29 | Service 4 |
| + | 2B | Service 5 |
| , | 2C | Service 6 |
| – | 2D | Service 7 |
| . | 2E | Service 8 |
| : | 3A | Service 9 |
| ; | 3B | Service 10 |
| | 5E | Service 11 |
| — | 5F | Service 12 |
| | MISCELLANEOUS LINES | |
| The following characters are used for special functions: | | |
| | 5C | Free Form Entry in Message |
| % | 25 | New Account Entry |
| * | 2A | Free Form Header |
| ? | 3F | Record Heading |
| ! | 21 | End of Record |
| / | 2F | End of Special Record |
| ] | 5D | Transmitting a Record |
| > | 3E | Receiving a Record |

TABLE 2

RECORD FORMAT

| FILE SEQUENCE | FILE |
|---|---|
| | RECORD STARTS HERE ↓ |
| 1 | RECORD HEADING |
| 2 | ROUTE HEADING (1st Route) |
| 3 | DISTRICT IDENTIFICATION (1st District) |
| 4 | STREET NAME (1st Street) |
| *5 + n | BUILDINGS (Single or Multiple) & SERVICES |
| 6 | STREET NAME (2nd Street) |
| *7 + n | BUILDINGS |
| | etc. |
| | DISTRICT (If more than one) (2nd District) |
| | STREET NAME |
| | BUILDING |
| | etc. |
| | ROUTE HEADING (2nd Route) if used |
| | Continue as above. |
| | END OF RECORD |

*This entry contains many Files; see further for more detailed description.

TABLE 3

RECORD HEADING-FILE

The format and description are as follows:

| ? ? |DATE | TIME | READER No. | DEVICE No. | No. OF ENTRIES | REPORT |

| FIELD | No. of Char. | Char. Type | DESCRIPTION | DP TRANSMIT | ASCII Code |
|---|---|---|---|---|---|
| ? ? | 2 | S | File Reference Designator | 3F, 3F | |
| DATE | 6 | N | Keyed-in by MR as MO, DAY, YEAR | 6 Spaces | (20) |
| TIME | 4 | N | Keyed-in by MR as HR, MIN. | 4 Spaces | (20) |
| READER NO. | 3 | AN | Keyed-in by MR | 3 Spaces | (20) |
| DEVICE NO. | 3 | N | Automatic entry by program-specifies | 3 Spaces | (20) |

TABLE 3-continued

RECORD HEADING-FILE

The format and description are as follows:
| ? ? |DATE | TIME | READER No. | DEVICE No. | No. OF ENTRIES | REPORT |

| FIELD | No. of Char. | Char. Type | DESCRIPTION | DP TRANSMIT | ASCII Code |
|---|---|---|---|---|---|
| | | | serial No. of device. | | |
| NUMBER OF ENTRIES | 1 | N | Specifies number of times header is keyed-in-retains latest data.Program entry. | 1 Zero | (30) |
| REPORT | 24 | AN | Keyed-in by MR | 24 Spaces | (20) |

Definitions: Reference Designator (field format code)
MR—Meter Reader
AN—Alpha Numeric
N—Numeric Only
DP—User Data Processor
A—Alpha Only
S—Symbols
T—per User Field Format Code Table FIELD FORMAT [XXXXXXXXXXXXXXXX]
MS Character LS Character Free Form-in full text

TABLE 4

ROUTE HEADING - FILE
| $$ | ROUTE | NO. OF ACCOUNTS IN ROUTE |

| FIELD | No. of Char. | Char. Type | DESCRIPTION | DP TRANSMIT | ASCII Code |
|---|---|---|---|---|---|
| $$ | 2 | S | File Reference Designator | 24, 24 | |
| ROUTE | T | AN | Provide Route Identification | Route | |
| NUMBER OF ACCOUNTS | 2 × T | N | Provide the total number of accounts contained in this route and an equal blank space. | First T = Number of accounts<br>Second T = All zeros (30) | |

TABLE 5

DISTRICT HEADING - FILE
| && | DISTRICT |

| FIELD | No. of Char. | Char. Type | DESCRIPTION | DP TRANSMIT | ASCII Code |
|---|---|---|---|---|---|
| && | 2 | S | File Reference Designator | 26, 26 | |
| DISTRICT | T | AN | Provide District Identification | District | |

TABLE 6

STREET HEADING - FILE
| == | STREET |

| FIELD | No. of Char. | Char. Type | DESCRIPTION | DP TRANSMIT | ASCII Code |
|---|---|---|---|---|---|
| == | 2 | S | File Reference Designator | 3D, 3D | |
| STREET | T | AN | Provide Street Name | Street | |

TABLE 7

SINGLE ACCOUNT BUILDING-FILE

| [ [ | STREET No. | SEQUENCE OR OPT. TIME | STATUS & ACCOUNT No. | KEY | LOCATION & HAZARD |

| FIELD | No. of Char. | Char. Type | DESCRIPTION | DP TRANSMIT | ASCII Code |
|---|---|---|---|---|---|
| [ [ | 2 | S | File Reference Designator | 5B, 5B | |
| STREET NO. | T | AN | Provide Street No. | Street | |
| SEQUENCE | 3 | N | Sequence-Stored by program, to indicate the numerical sequence in which buildings were serviced. | Spaces | (20) |
| OR | | | | | |
| TIME | 4 | N | Time-If option is exercised, time of day stored by program as HRS, MINS. | Spaces | (20) |
| STATUS AND ACCOUNT NO. | T | AN | First Character is always Status of Account; O = open; C = closed. Subsequent characters indicate Account number. | 4F, Account No. or 43, Account No. | |
| KEY | T | AN | Key No. to gain entry in meter room | Key Number or zeros | |

TABLE 7-continued

SINGLE ACCOUNT BUILDING-FILE

| [ [ | STREET No. | SEQUENCE OR OPT. TIME | STATUS & ACCOUNT No. | KEY | LOCATION & HAZARD |
|---|---|---|---|---|---|

| FIELD | No. of Char. | Char. Type | DESCRIPTION | DP TRANSMIT | ASCII Code |
|---|---|---|---|---|---|
| LOCATION & HAZARD | T | AN | Coded or Free Form, | L & H | |

TABLE 8

MULTIPLE ACCOUNT BUILDING - FILE

\| ## \| STREET NO. \| SEQUENCE OR TIME \| KEY \| LOCATION & HAZARD \|

| FIELD | No. of Char. | Char. Type | DESCRIPTION | DP TRANSMIT | ASCII Code |
|---|---|---|---|---|---|
| ## | 2 | S | File Reference Designator | 23, 23 | |
| STREET NO. | T | AN | Provide Street Number | Street Number | |
| SEQUENCE OR | 3 | N | Seq. - Stored by program to indicate the numerical sequence in which buildings were serviced. | Spaces | (20) |
| TIME | 4 | N | Time - If option is exercised, time of day stored by Meterlog as HRS, MINS. | Spaces | (20) |
| KEY | T | AN | Meter Room Key | Key Number or zeros | |
| LOCATION & HAZARD | T | AN | Coded or Free Form | L & H | |

TABLE 9

APPARTMENTS - FILE

\| << \| APT. NO. \| STATUS AND ACCOUNT NUMBER. \| KEY \| LOCATION & HAZARD \|

| FIELD | No. of Char. | Char. Type | DESCRIPTION | DP TRANSMIT | ASCII Code |
|---|---|---|---|---|---|
| << | 2 | S | File Reference Designator | 3C, 3C | |
| APART. NO. | T | AN | Provide Apartment Number | Apartment No. | |
| STATUS AND ACCOUNT No. | T | AN | First character is either O = open or C = closed account. Rest is account number. | 4F, Account No. or 43, Account No. | |
| KEY | T | AN | Provide Meter Room Key | Key Number or zeros | |
| LOCATION & HAZARD | T | AN | Coded or Free Form | L & H | |

TABLE 10

SERVICES-FILE

| SERVICE CODE 12 Types | METER CONST. & NUMBER | NO. OF ENTRIES | METER READING | HI READ | LO READ | FIELD REPORT | KEY | LOC & HAZ |
|---|---|---|---|---|---|---|---|---|

This format is standard for all 12 service types. Each type can be programmed differently with regard to field length. Specify as many as desired.

| FIELD | No. of Char. | Char. Type | DESCRIPTION | DP TRANSMIT | ASCII Code |
|---|---|---|---|---|---|
| " " | 2 | S | File Reference Designator-Service 1 | 22, 22 | |
| METER CONST. & NUMBER | T | AN | Provide Meter Constant & Meter Number | Meter Const. & No. | |
| No. of ENTRIES | 1 | N | program stores the number of times a read is stored. | Zero | (30) |
| METER READING | T | N | MR stores meter reading | Spaces | (20) |
| HI READ | T | N | Provide HI limit to Meter Reading | HI Read | |
| LO READ | T | N | Provide LO limit to Meter Reading | LO Read | |
| FIELD REPORT | 3 | AN | MR stores report on field conditions, could be coded or free form | Spaces | (20) |
| KEY | T | AN | Key No. to gain entry in meter room | Key number or zeros | |
| LOCATION & HAZARD | T | AN | Coded or free form | L & H | |

TABLE 11

NEW ACCOUNTS-FILE

| % one only | SEQUENCE OR TIME | NEW ACCOUNT |
|---|---|---|

← 23 characters total →

| FIELD | No. of Char. | Char. Type | DESCRIPTION |
|---|---|---|---|
| % | 1 | S | File Reference Designator (one only) (25) |
| SEQUENCE | 3 | N | Seq.-Stored by program to indicate the numerical sequence in which buildings were serviced. |
| OR TIME | 4 | N | Time-If option is exercised, time of day stored by program as HRS, MINS. |
| NEW ACCOUNT | 19 or 18 | AN | Keyed-in by Meter Reader. |

TABLE 12

FREE FORM ENTRIES-FILE

| * one only | FREE FORM ENTRY |
|---|---|

← 23 characters total →

| FIELD | No. of Char. | Char. Type | DESCRIPTION |
|---|---|---|---|
| * | 1 | S | File Reference Designator (one only) (2A) |
| FREE | 22 | AN | Keyed-in by MR. Either Loc & |

TABLE 12-continued

FREE FORM ENTRIES-FILE

| * one only | FREE FORM ENTRY |
|---|---|

← 23 characters total →

| FIELD | No. of Char. | Char. Type | DESCRIPTION |
|---|---|---|---|
| FORM | | | Haz or Field Report. |

NOTE: Free Form is a text entry by the meter reader

TABLE 13

END OR RECORD - FILE

| !! | NO. OF CHARACTERS IN RECORD | ← TRANSMISSION FROM COMPUTER ENDS HERE |

| FIELD | No. of Char. | Char. Type | DESCRIPTION | DP TRANSMIT | ASCII Code |
|---|---|---|---|---|---|
| !! | 2 | S | File Reference Designator | 21, 21 | |
| NO. OF CHARACTERS | 5 | N | Specify the total number of characters in Record. Include Reference Designators, spaces and End of Record - used for Sum-Check. | Total Number of characters. | |

TABLE 14

FILE FORMAT SUMMARY

| | |
|---|---|
| RECORD HEADING | ? ? / DATE / TIME / READER NO. / DEVICE NO. / NO OF ENTRIES / REPORT |
| ROUTE | $ $ / ROUTE / NO. OF ACCOUNTS |
| DISTRICT | & & / NAME |
| STREET | = = / STREET |
| SINGLE ACCOUNT BUILDING | [ [ / STREET NO. / SEQUENCE OR TIME / STATUS & ACCOUNT NO. / KEY / LOCATION & HAZARD |
| MULTIPLE ACCOUNT BUILDING | # # / STREET NO. / SEQUENCE OR TIME / KEY / LOCATION & HAZARD |
| APARTMENTS | < < / APT. NO. / STATUS & ACCOUNT NO / KEY / LOCATION & HAZARD |
| SERVICES | SERVICE CODE / METER CONST & NUMBER / NO. OF ENTRIES / METER READING / HI READ / LO READ / FIELD REPORT / KEY / LOC & HAZ |

TABLE 14-continued

FILE FORMAT SUMMARY

| | | | | |
|---|---|---|---|---|
| END OF RECORD | !! | NO. OF CHARACTERS IN RECORD | ← | TRANSMISSION FROM COMPUTER ENDS HERE |

TABLE 15A

FIELD FORMAT CODE TABLES

T in the number of characters per field column, indicates a user entry to customize the device to comply to their data processing procedures. If T is equal to zero the field is deleted from the file and Tables.

RECORD HEADING TABLE

Reference Designator field format code? (ASCII-3F)

| | FIELD | No. Of Characters Per Field |
|---|---|---|
| Memory Location XI→ | DATE | 6 |
| | TIME | 4 |
| | READER NO | 3 |
| | DEVICE NO | 3 |
| | NO OF ENTRIES | 1 |
| | REPORT | 24 |
| | TABLE END CODE | |

TABLE 15B

ROUTE HEADING TABLE

Reference Designator field format code $ (ASCII-24)

| | FIELD | No. Of Characters Per Field |
|---|---|---|
| Memory Location X2→ | ROUTE | T |
| | NO OF ACCOUNTS | 2 × T |
| | TABLE END CODE | |

TABLE 15C

DISTRICT HEADING TABLE

Reference Designator Field Format Code & (ASCII-26)

| | FIELD | No. Of Characters Per Field |
|---|---|---|
| Memory Location X3→ | NAME | T |
| | TABLE END CODE | |

TABLE 15D

STREET HEADING TABLE

Reference Designator Field Format Code = (ASCII-3D)

| | FIELD | No. Of Characters Per Field |
|---|---|---|
| Memory Location X4→ | NAME | T |
| | TABLE END CODE | |

TABLE 15E

SINGLE ACCOUNT BUILDING TABLE

Reference Designator Field Format Code [ (ASCII-5B)

| | FIELD | No. Of Characters Per Field |
|---|---|---|
| Memory Location X5→ | STREET NO | T |
| | SEQUENCE/ TIME | 3 or 4 |
| | STATUS & ACCOUNT NO | T |
| | KEY | T |
| | LOC & HAZ | T |
| | TABLE END CODE | |

TABLE 15F

MULTIPLE ACCOUNT BUILDING TABLE

Reference Designator Field Format Code # (ASCII-23)

| | FIELD | No. Of Characters Per Field |
|---|---|---|
| Memory Location X6→ | STREET NO | T |
| | SEQ or TIME | 3 or 4 |
| | KEY | T |
| | LOC & HAZ | T |
| | TABLE END CODE | |

TABLE 15G

APARTMENTS TABLE

Reference Designator Field Format Code < (ASCII-3C)

| | FIELD | No. Of Characters Per Field |
|---|---|---|
| Memory Location X7→ | APT NO | T |
| | STATUS & ACCOUNT NO | T |
| | KEY | T |
| | LOC & HAZ | T |
| | TABLE END CODE | |

TABLE 15H

SERVICES TABLE

Reference Designator Field Format Code 12 Types - See Table 1

| | FIELD | No. Of Characters Per Field |
|---|---|---|
| Memory Location X8→ thru X19 | METER CONST. & NUMBER | T |
| | NO OF ENTRIES | 1 |
| | METER READING | T |
| | HI READ | T |
| | LO READ | T |
| | FIELD REPORT | 3 |
| | KEY | T |
| | LOC & HAZ | T |
| | TABLE END CODE | |

TABLE 15I

END OF RECORD TABLE

Reference Designator Field Format Code! (ASCII-21)

| | FIELD | No. Of Characters Per Field |
|---|---|---|
| Memory Location X20→ | NO OF CHARACTERS IN RECORD | 5 |
| | TABLE END CODE | |

TABLE 15J

NEW ACCOUNT TABLE

Reference Designator Field Format Code % (ASCII-25)

| | FIELD | No Of Characters Per Field |
|---|---|---|
| Memory Location X21→ | SEQ or TIME | 3 or 4 |
| | NEW ACCOUNT | 19 or 18 |
| | TABLE END CODE | |

TABLE 15K

| FREE FORM ENTRIES TABLE<br>Reference Designator Field Format Code * (ASCII-2A) | | |
|---|---|---|
| | FIELD | No Of Characters Per Field |
| Memory Location X22→ | FREE FORM | 22 |
| | TABLE END CODE | |

TABLE 15L

POINTER TABLE

| Reference Designator | ASCII Code | Field Format Table Address | Field Format Table |
|---|---|---|---|
| ! | 21 | X20 | END OF RECORD |
| " | 22 | X8 | Service 1 |
| # | 23 | X6 | MULTIPLE BLDG |
| $ | 24 | X2 | ROUTE HEADING |
| % | 25 | X21 | NEW ACCOUNTS |
| & | 26 | X3 | DISTRICT HEADING |
| ' | 27 | X9 | SERVICE 2 |
| ( | 28 | X10 | SERVICE 3 |
| ) | 29 | X11 | SERVICE 4 |
| * | 2A | X22 | FREE FORM ENTRIES |
| + | 2B | X12 | SERVICE 5 |
| , | 2C | X13 | SERVICE 6 |
| - | 2D | X14 | SERVICE 7 |
| . | 2E | X15 | SERVICE 8 |
| : | 3A | X16 | SERVICE 9 |
| ; | 3B | X17 | SERVICE 10 |
| < | 3C | X7 | APARTMENTS |

TABLE 15L-continued

POINTER TABLE

| Reference Designator | ASCII Code | Field Format Table Address | Field Format Table |
|---|---|---|---|
| = | 3D | X4 | STREET HEADING |
| ? | 3F | X1 | RECORD HEADING |
| [ | 5B | X5 | SINGLE ACC BLDG |
| | 5E | X18 | SERVICE 11 |
| — | 5F | X19 | SERVICE 12 |

TABLE 15M

SERVICE IDENTIFICATION TABLE

| SERVICE CODE REF. DES. | ASCII CODE | CHARACTER TO BE DISPLAYED | FILE |
|---|---|---|---|
| " | 22 | E (electric) | SERVICE 1 |
| ' | 27 | G (gas) | SERVICE 2 |
| ( | 28 | W (water) | SERVICE 3 |
| ) | 29 | D (demand) | SERVICE 4 |
| + | 2B | etc. | SERVICE 5 |
| , | 2C | | SERVICE 6 |
| - | 2D | | SERVICE 7 |
| . | 2E | | SERVICE 8 |
| : | 3A | | SERVICE 9 |
| ; | 3B | | SERVICE 10 |
| | 5E | | SERVICE 11 |
| — | 5F | | SERVICE 12 |

This Table is filled by Utility.

TABLE 16A

| GLOSSARY OF ABBREVIATIONS | LIST OF ROUTINES |
|---|---|
| APT = Apartment | CSTD = Clear Status and Display |
| DICT = Dictionary | DAF = Data available from keyboard |
| DISP = Display | DISPROT = Rotate Display to Next Field |
| EX = Execute Key | DSF = Keyboard Request to display |
| F.F. Free Form | DISP CVRT = Convert to Display Code 14 segment |
| HDR = Header of Display | KEYROU = Routine Responding to Keyboard |
| INIT = Power Key on Position INIT | MAIN = Main Executive Routine |
| I/O = Interface | RECE = I/O Main Routine |
| MR (9) = Memory location addressed by register R(9) | TSR = Real Time Clock Routine |
| MULT = Multiple | TS = Second Pulse to Increment Clock |
| R(8) = Register R(8) | |
| R.D. = Reference Designator Field Format Code | |
| REC = Receive | |
| ST = Status of Program | |
| STR = Store in Memory | |
| TR = Transmit | |
| XMIT = Transmit | |
| REV = Reverse, move RAM address register backwards to | |
| FOR = Forward, move RAM address register forward to | |
| DF = A Display data in display buffer | |
| NF = B from field A to field B | |
| A, B, C, D, Display registers in memory. Contain data to be displayed. | |
| C.A.R. = Current Account Register | |
| TIME REG = Time of Day Register | |
| SEQ REG = Sequence Register | |
| DIR REG = Direction Register | |
| NEW ACC REG = New Accounts Register | |
| SPEC REC = Special Record | |
| ACC ID REG = Account Identifying Register | |
| DISP BUF = Display Buffer | |
| XFR = Transfer | |
| F. REP = Field Report | |
| RTL = Right to left | |

TABLE 16A-continued

| GLOSSARY OF ABBREVIATIONS | LIST OF ROUTINES |
|---|---|
| LTR = Left to right | |
| TABLE = Field Format Table | |

What is claimed is:

1. A routing and recording system comprising: a portable recording apparatus for recording data for a plurality of accounts located in single account and multiple account buildings along various streets to be covered by an operator visiting such accounts with said apparatus; said system including data memory means containing account files arranged in an order corresponding to the desired sequence the accounts are to be visited, there being associated with each account file data storage fields containing the street name and building number and apartment number identifying each account, and transaction storage fields for receiving transaction data for the account; said apparatus including display means and operator input means, said display means for displaying information from said data memory means and from said operator input means, said operator input means including means for selectively generating basic entry and retrieval signals for storing in and retrieving data from said account files in said data memory means, means for selectively generating forward and reverse direction account file accessing signals for requesting access to the next account in a multiple account building or a particular street involved listed in said account files in said data memory means, and means for generating a search missed account signal for requesting the scanning of the account files for accounts in said multiple account building or said street involved missed by the operator; said apparatus including programming means including means responsive to said basic entry and retrieval signals for accessing the desired data storage fields and transaction storage fields associated with said account files as indicated by said signals, entering the data from said operator input means in and retrieving data from said storage fields and displaying said data on said display means, said programming means including direction register means for storing the selected direction of account scanning, means responsive to said forward or reverse direction account file accessing signal for registering said signal in said direction register means, means responsive to said search missed account signal for effecting the scanning of said account files in said data memory means in the direction indicated by the signal stored in said direction register means starting with the current account as addressed or the next account in the desired visiting sequence in the multiple account building or street involved for determining if the associated transaction storage fields for each account contain transaction data entered by the operator, means responsive to the presence of transaction data in said transaction storage fields for continuing said search in the same direction to the next accounts in said data memory means for locating transaction data empty fields, means responsive to the absence of such data in said transaction storage fields for terminating said scanning operation, and means responsive to such data absence for then indicating on said display means the identity of the missed account so that the operator can then proceed to the missed account and enter transaction data.

2. The routing and recording system of claim 1 wherein the last mentioned means is responsive to the absence of such data in a scanned account when the account is in a multiple account building for terminating said scanning operation and indicating on said display means the identity of the missed account in the multiple account building.

3. The routing and recording system of claim 1 or 2 wherein said programming means includes means responsive during a search missed scanning operation in a given requested direction for identifying when the end of the street is reached, and means for then terminating said scanning operation of the accounts at the last account in the street and for displaying on said display means an end of street indication thereon, so that the operator can decide whether or not to access the first account of the next street to be serviced or request another search missed mode of operation in the opposite direction.

4. The routing and recording system of claim 2 wherein said programming means including means operative during the missed account scanning of the account files in a given direction for determining that the last account in a multi-account building has been reached, and means for terminating the scanning operation of the accounts at the last account reached and for displaying on said display means an end of multiple account building indication, so that the operator can decide whether or not to access the first account file of the next single or multiple account building to be serviced or to request another search missed mode of operation in the opposite scanning direction.

5. A routing and recording system comprising: a portable recording apparatus for recording the data displayed on a plurality of utility meters located in single account and multiple account buildings along various streets to be covered by a meter reader visiting such accounts with said apparatus; said system including data memory means containing account files and related service files, street files, building files and apartment files containing respectively the street names, building numbers and, apartment numbers said account files including other data identifying each account, said related service files for each account respectively including data identifying the meters therefor and the locations at which meter readings are to be taken, and data storage fields for receiving meter reading data and other data-receiving fields; said apparatus including display means and meter reader input means, said display means for displaying information from said data memory means and from said meter reader input means, said meter reader input means including means for selectively generating basic entry and retrieval signals for storing and retrieving data from said account files and service files in said data memory means, means for selectively generating forward and reverse direction account file accessing signals for requesting access to the next and previous account listed in said account files in said data memory means, and means for generating address account request signals for requesting a display of the data identifying the account currently accessed; said apparatus including programming means including means responsive to said basic entry and retrieval signals for accessing the desired data storage fields in said account files and service files as indicated by said signals, entering the data from said meter reader input means and retrieving data from said storage fields and displaying said data on said display means, direction register means for storing the selected direction of account scanning as indicated by said forward or reverse direction account accessing signal, and current account register means containing the addresses in said data memory means of the street file, building file, account file and service files associated with the account currently accessed, means responsive to said address account request signals for addressing the said data memory means with said current account register means, extracting the street name from said street file associated with the account currently accessed and displaying this data on said display means and for then addressing said building file associated with said account currently accessed and extracting and displaying on said display means the building number, means for then effecting a search in said data memory means for a service file associated with said currently accessed account and as each said service file is found for extracting from a field thereof the meter type stored therein and displaying this data simultaneously on said display means for all service files in the account requested, and means for then terminating said memory search when no further service files exist for said current account, so that the meter reader can see a simultaneous summary display of all the meter types to be visited for that account.

6. The routing and recording system of claim 5 wherein said programming means including means responsive to each successive individual generation of said forward or reverse direction account file accessing signals for respectively registering said signals in said direction register means and for sequentially advanciang said current account register means to the next or previous account as indicated by the signal stored in said direction register means then for accessing the said data memory means with said updated current account register means for extracting and displaying in said display means in a similar manner as previously cited the next account address and the summary of all services associated with the address displayed.

7. A routing and recording system comprising: a portable recording apparatus for recording transaction data from a plurality of accounts located in single account and multiple account buildings along various streets to be covered by an operator visiting such accounts with said apparatus; said system including data memory means containing different area type files, account files and related service files, said area type files respectively including area type data storage fields containing area type data comprising street names and multiple account building numbers, the fields of each area type file to be addressd in a given predetermined or desired visiting order, said account files including data identifying each account, said related service files including data identifying the transactions, and data storage fields for receiving transaction data; said apparatus including display means and operator input means, said display means for displaying information from said data memory means and from said operator input means, said operator input means including means for selectively generating signals including basic entry and retrieval signals for storing or retrieving data in said account files and service files in said data memory means, some of said signals being a number of area type list request signals each identifying a different specific area type data to be sequentially displayed on said display means from the selected area type file; said apparatus including programming means including addressing and other means responsive to said basic entry and retrieval signals for accessing the desired data storage fields in said account files or service files and entering transaction data from said operator input means and retrieving data from the storage fields of the accessed account or related service files and displaying said data on said display means, area type data register means for storing the area type requested to be listed as identified by the generated area type list request signal, means responsive to the generated list request signal for storing the requested area type data in said area type register means, said addressing means also including means responsive to the area type data in said area type register means for addressing the fields of the selected area type file in the desired visiting order, and means for then sequentially extracting area type data from said fields and transferring to said display means the selected area type identifying data requested, so that the operator can see the sequence of the areas of the type selected to be visited and he can select the area to be serviced.

8. The routing and recording system of claim 7 wherein said operator input means include means for generating forward and reverse direction account file accessing signals, and the last mentioned means of claim 7 includes means responsive to each generation of a forward or reverse direction account file accessing signal to address the next area type field of the selected area type file in the desired visiting direction and order involved.

9. The routing and recording system of claim 7 wherein each of said area type files for each area type has storage location fields with the applicable area type data therein shared in common with all accounts located in the same area type involved to avoid data storage duplication of the same area type data for all of the accounts in the same area type, said addressing means addressing the same area type data fields in each area type file for the various groups of accounts involved in the desired visiting order, said operator input means include means for selectively generating forward and reverse direction account file accessing signals and at least two different list request signals respectively identifying street and building area types desired to be identified in said display means; said programming means including direction register means for storing said forward or reverse direction account accessing signals, and area type register means for addressing the area type files in said data memory means, said programming means including means responsive to said list request signal identifying the area type selected for setting and first addressing with said area type register means the area type data field of the selected area type file in said data memory means associated with the currently accessed account, means for then extracting from said addressed field of said selected area type file and transferring to said display means the stored area type identifying data in which the current account is located; means responsive to each subsequent individual generation of said forward or reverse direction account file accessing signals for respectively registering said signals in said direction register means and for sequentially advancing said area type register means to the next or previous area type data field in the selected area type file as indicated by said signal stored in said direction register means, and means for accessing the said data memory means with said updated area type register means for extracting and displaying in said display means said area type identifying data in the same sequence to be visited by the operator.

10. The routing and recording system of claim 9 wherein said programming means including current account register means, said programming means including means responsive to each said subsequent generation of said forward or reverse direction account file accessing signal for updating said current account register means to the storage location address of the first building or apartment related to each step in the sequence of the area type being listed, so that the operator, electing to stop at any given step in the sequence, can immediately service the first account in that selected area type without further key actuation from said operator input means.

11. The routing and recording system of claim 7 wherein said programming means include means responsive to said list request signals for initiating the sequential display of the selected area type identifying data, with the area type in which the current account is located.

12. The routing and recording system of claim 7 wherein said operator input means include means for generating forward or reverse direction account file accessing signals; said programming means including direction register means for storing said forward or reverse direction account file accessing signals, and current account area type register means for addressing the area type files in said data memory means, said programming means including means responsive to each subsequent individual generation of said forward or reverse direction account file accessing signals for respectively registering said signals in said direction register means and for sequentially advancing said current account area type register means to the next or previous area type identifying data in the selected area type file as indicated by said signal stored in said direction register means, and means for accessing the said data memory means with said updated area type register means for extracting and displaying in said display means said area type identifying area, so that the operator can see a quick summary of the sequence in which the areas are to be visited and for selecting an area to be serviced.

13. The routing and recording system of claim 12 wherein said programming means including means for displaying end of area in said display means when each said area type file is fully accessed.

14. A routing and recording system comprising: a portable recording apparatus for recording the data displayed on a plurality of utility meters located in single account and multiple account buildings along various streets to be covered by the meter reader visiting such accounts with said apparatus; said system including data memory means containing account files and related service files, said account files including data identifying each account, said related service files including data identifying the meter or meters therefor and the locations at which meter readings are to be taken, and data storage fields for receiving meter reading data and other data receiving fields; said apparatus including display means and meter reader input means, said display means for displaying information from said data memory means and from said meter reader input means, said meter reader input means including means for selectively generating basic entry and retrieval signals for storing and retrieving data from said account fields and service files in said data memory means, means for generating forward or reverse direction account file accessing signals, and means for generating service request signals for requesting a display of meter identifying data from the service files associated with the account currently accessed; said apparatus including programming means including means responsive to said entry and retrieval signals for accessing a desired data storage field, entering the data from said meter reader input means in the selected data storage field and displaying on said display means the account to be visited and the selected data from said data memory means and said meter reader input means, direction register means for storing said forward or reverse direction account file accessing signals, current account register means containing the addresses of said account files and service files associated with the account currently being accessed and including a current account service register means for identifying the current service file being accessed; and means responsive to each generation of said service request signal for accessing the next service file in the sequence associated with said current account, starting with the service file of the currently accessed account as indicated by said current account service register means, and means for updating said current account service register means when said next service file for the account involved is accessed, means for extracting meter identifying data from the fields thereof, and displaying said data in said display means, means responsive to each subsequent generation of said service request signal for accessing in like manner a different one of said service files of the currently accessed account and when the last service file is accessed to access the first service file again when the next service request signal is generated.

15. The routing and recording system of claim 14 wherein said signals generated by said meter reader input means including a search missed account signal requesting the scanning of said account files for service files not containing meter readings, said programming means including means responsive to said search missed account signal for effecting the scanning of said service files in said data memory means with said current account service register means starting with said current account for associated service files not containing meter readings, and when such a service file is found, then terminating said scanning operation, updating said current account service register means and displaying on said display means the meter identifying data contained in said service file thereof, so that the meter reader can then enter the meter reading or other data in said service file.

16. The routing and recording system of claim 15 wherein said programming means responsive to said search missed account signal including means for continuing said scanning operation for service files not containing meter readings to the next account or accounts in the sequence in said data memory means until one service file not containing meter readings is found, then terminating the said scanning operation, updating the said current account register means and displaying on said display means the account identifying data so that the meter reader can then proceed to that account address and enter a reading.

17. The routing and recording system of claim 16 wherein said programming means including means responsive to said search missed account signal and to each subsequent individual generation of said forward or reverse direction account file accessing signals for registering said signals in said direction register means and for initiating with each generation of said forward or reverse direction signal another scanning operation in said data memory means starting with the last current account service file as addressed with said current account register means in the direction indicated by the signal stored in said direction register means for locating service files not containing meter readings, and when one is found, for terminating said scanning operation, updating said current account register means and displaying on said display means the account identifying data associated with said service file found without meter reading data so that the meter reader can then proceed to said displayed account address and enter a meter reading or request another scanning operation in said data memory means for other accounts without meter reading data.

18. The routing and recording system of claim 16 wherein said programming means including means for terminating the said scanning operation when the end of the current area is reached and for displaying on said display means an end of area indication.

19. The routing and recording system of claim 16 wherein said programming means including means for displaying on said display means that the selected area type scan has been completed.

20. A routing and recording system comprising: a portable recording apparatus for recording the data displayed on a plurality of utility meters located in single account and multiple account buildings along various streets to be covered by a meter reader visiting such accounts with said apparatus; said system including data memory means containing account files and related service files, said account files including data identifying each account, said related service files including data identifying the meter or meters therefor and the locations at which meter readings are to be taken, and data storage fields for receiving meter reading data and other data receiving fields; said apparatus including display means and meter reader input means, said display means for displaying information from said data memory means and from said meter reader input means, said meter reader input means including means for selectively generating basic entry and retrieval signals for storing and retrieving data from said account files and service files in said data memory means, alpha-numeric data input signals, and locate account request signals identifying a distinct account parameter through which a selected account from said account files is to be located, such as a building number, account number, and meter number and accompanying distinct account parameter identifying data as identified by said alpha-numeric data input signals; said apparatus including programming means including means responsive to said entry and retrieval signals for accessing a desired data storage field, entering the data in the selected data such as a meter reading in the selected storage field and displaying on said display means the account to be visited, and selected data from said data memory means and said meter reader input means, locate account identifying register means for storing said accompanying distinct account parameter identifying data, and current account register means for identifying the file locations in said data memory means of the account files and service files associated with the account currently accessed; means responsive to said locate account request signals identifying a distinct account parameter and to said distinct account parameter identifying data as indicated by said alpha-numeric data input signals, for storing said alpha-numeric data input signals in said locate account identifying register means, and means responsive to said locate account request signals for scanning each account in said data memory means for the particular field pertaining to said distinct account parameter used for locating the account, means for then extracting this data from said field thereof and comparing said data with the contents of said locate account identifying register means, means responsive to the inequality of the compared data for continuing the search in said data memory means until comparison is found, and means for then terminating such memory scan and for updating all said current account register means and for showing on said display means the located account in the building and street involved and an indication that it was found, so that the meter reader can then gain access to the associated meter reading data receiving field and enter the meter reading or other data or retrieve data from said account file, and means for terminating such search in the event the selected account cannot be found in said account files and for showing on said display means an account not found indication.

21. The routing and recording system of claim 20 wherein there is provided means for generating forward and reverse direction account file accessing signals, register means for storing said forward and reverse direction account file accessing signals, and wherein said programming means includes means responsive to each generation of said forward or reverse direction account file accessing signals for storing said forward or reverse direction account file accessing signal in said direction register means, then for initiating the search for said account being located starting at the beginning or end of the designated area as indicated by the signal stored in said direction register means and for starting the search from the current account along the direction selected as indicated by the signal stored in said direction register means.

22. A routing and recording system comprising: a portable recording apparatus for recording the data displayed on a plurality of utility meters located in single account and multiple account buildings along various streets to be covered by a meter reader visiting such accounts with said apparatus; said system including data memory means containing, account files and related service files, and including new account files, said account files including data identifying each account and containing a storage field for storing a distinct sequence number identifying the sequence in which each of said accounts are serviced, said related service files including data identifying the meter or meters therefor and the locations at which the meter readings are to be taken, and data storage fields for receiving meter reading data and other data receiving fields, said new account files for storing new accounts not originally included in the account and related service files; said apparatus including display means and meter reader input means, said display means for displaying information from said data memory means and from said meter reader input means, said meter reader input means including means for selectively generating basic entry and retrieval signals for entering data into a selected account file and for retrieving data from said data memory means and displaying said data on said display means, and means for generating forward or reverse direction account file accessing signals, alpha-numeric input signals, address account request signals for accessing an identified account file and new account signals for storing new account data not originally included in said account files; said apparatus including programming means including means responsive to said basic entry and retrieval signals for accessing a desired storage field, entering the data from said meter reader input means in the selected data storage field and displaying on said display means the account to be visited and selected data from said data memory means or said meter reader input means, new accounts register means for addressing said new accounts files, means responsive to said new accounts signal and to the generation of subsequent entry of new account and meter reading data from said alpha-numeric input signals by the meter reader, for setting said new accounts register means to the address of the next available not previously used field in said new accounts file in said data memory means, then for accessing said new accounts file with said updated new accounts register means and for storing said new account and meter reading data in said accessed field in said new accounts file, and means further for storing in an associated field in said new accounts file said next sequence number to indicate the servicing order of the new account for later inclusion in the account files in the proper visiting sequence.

* * * * *